(12) United States Patent
Manolakos et al.

(10) Patent No.: US 11,690,019 B2
(45) Date of Patent: Jun. 27, 2023

(54) SOUNDING REFERENCE SIGNAL CARRIER SWITCHING

(71) Applicant: QUALCOMM Incorporated, San Diego, CA (US)

(72) Inventors: Alexandros Manolakos, Escondido, CA (US); Alberto Rico Alvarino, San Diego, CA (US); Pranay Sudeep Rungta, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/220,895

(22) Filed: Apr. 1, 2021

(65) Prior Publication Data

US 2021/0314872 A1 Oct. 7, 2021

Related U.S. Application Data

(60) Provisional application No. 63/005,171, filed on Apr. 3, 2020.

(51) Int. Cl.
*H04W 52/14* (2009.01)
*H04W 24/08* (2009.01)
(Continued)

(52) U.S. Cl.
CPC ......... *H04W 52/143* (2013.01); *H04L 5/0051* (2013.01); *H04L 25/0226* (2013.01); *H04W 24/08* (2013.01)

(58) Field of Classification Search
CPC ..... H04L 5/001; H04L 5/0048; H04L 5/0051; H04L 5/0098; H04L 25/0224;
(Continued)

(56) References Cited

U.S. PATENT DOCUMENTS

2017/0290041 A1  10/2017  Rico Alvarino et al.
2021/0126816 A1*  4/2021  Davydov .......... H04W 72/0493
(Continued)

FOREIGN PATENT DOCUMENTS

EP        3706353 A1    9/2020
WO  2017173388 A1  10/2017
(Continued)

OTHER PUBLICATIONS

International Search Report and Written Opinion—PCT/US2021/025582—ISA/EPO—dated Jun. 24, 2021.

*Primary Examiner* — Pao Sinkantarakorn
(74) *Attorney, Agent, or Firm* — Procopio, Cory, Hargreaves & Savitch LLP/Qualcomm

(57) ABSTRACT

Techniques for reference signaling related to transmission power controls for communication devices are discussed and provided. A user equipment (UE) receives one or more sounding reference signal (SRS) transmission power control (TPC) configuration for uplink carriers. The SRS TPC configuration can comprise a mapping from one uplink carrier to one or more component carrier sets. The UE receives, from a monitoring cell, a downlink control information (DCI) comprising a request for SRS transmission on uplink carrier(s) and/or TPC command(s) for SRS transmission on the uplink carrier(s). The UE determines uplink carrier(s) corresponding to the SRS request and/or the TPC command(s) at least based on a correspondence between the SRS TPC configurations and the one or more uplink carriers or based on starting bit information.

28 Claims, 11 Drawing Sheets

(51) Int. Cl.
*H04L 5/00* (2006.01)
*H04L 25/02* (2006.01)

(58) Field of Classification Search
CPC ............ H04L 25/0226; H04W 52/143; H04W 52/146; H04W 52/325; H04W 52/34; H04W 72/042
See application file for complete search history.

(56) References Cited

U.S. PATENT DOCUMENTS

2021/0144716 A1* 5/2021 Choi .................... H04W 76/27
2021/0392609 A1* 12/2021 Siomina ................ H04W 64/00
2022/0132542 A1* 4/2022 Matsumura ......... H04W 72/042

FOREIGN PATENT DOCUMENTS

WO 2019096277 A1 5/2019
WO 2020056180 A1 3/2020

* cited by examiner

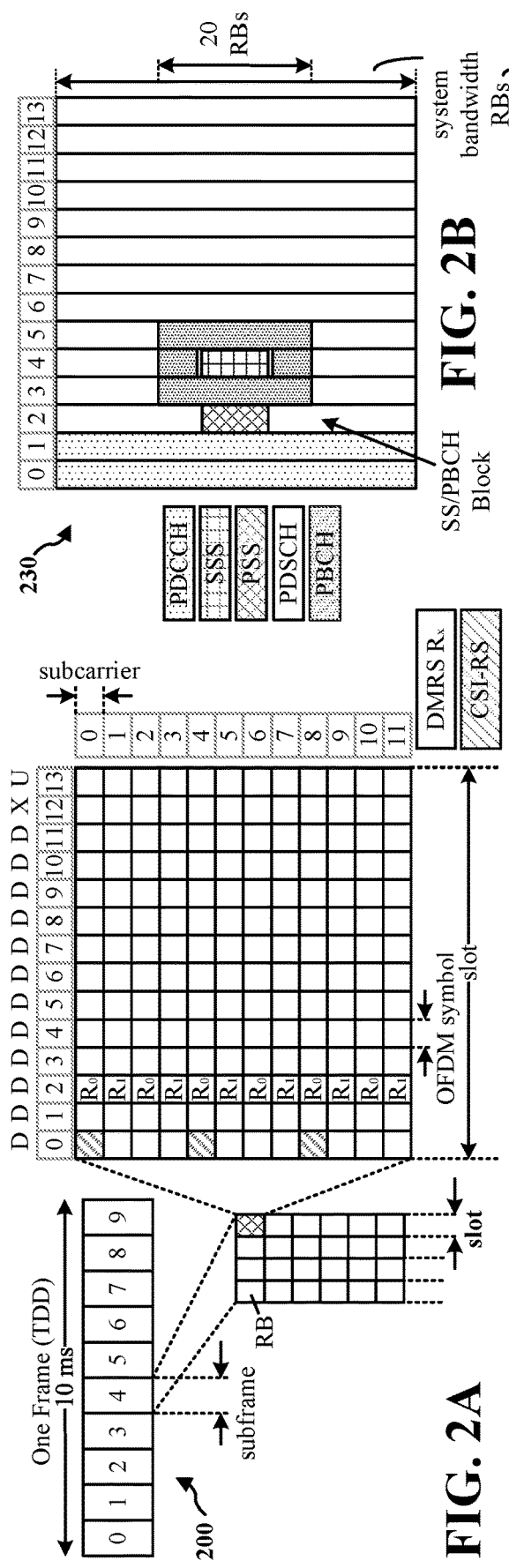
FIG. 2A
FIG. 2B
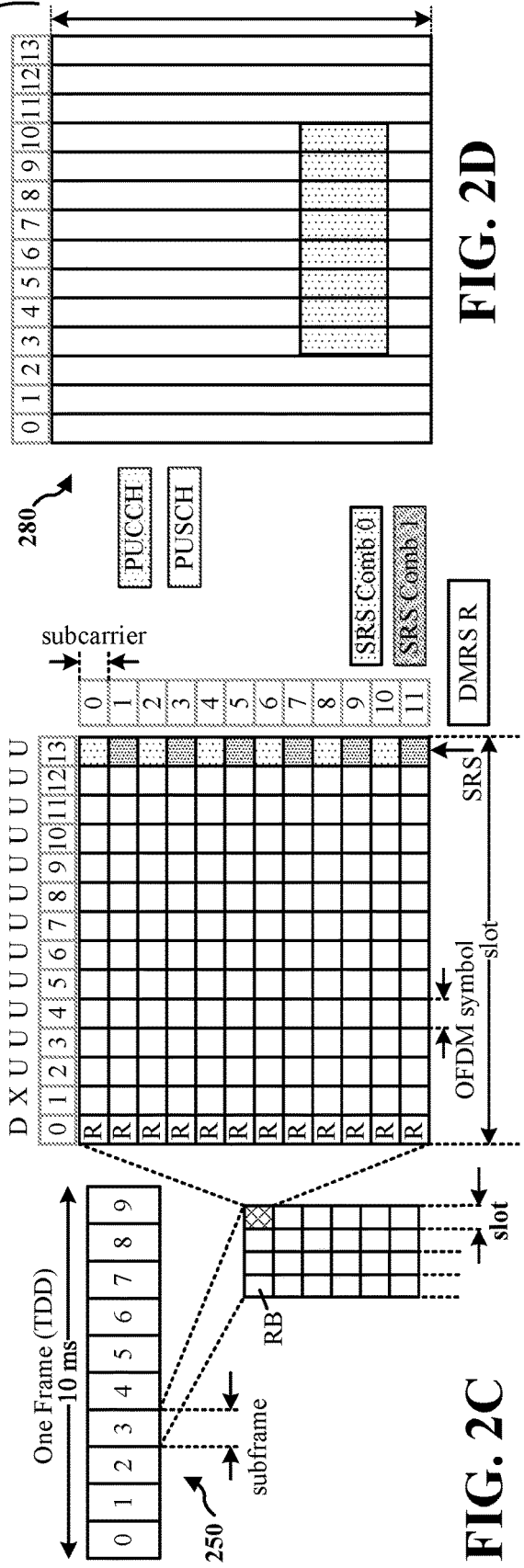
FIG. 2C
FIG. 2D

SOUNDING REFERENCE SIGNAL CARRIER SWITCHING

CROSS REFERENCE TO RELATED APPLICATION

This application claims the benefit of U.S. Provisional Application Ser. No. 63/005,171, entitled "Sounding Reference Signal Carrier Switching" and filed on Apr. 3, 2020, which is expressly incorporated by reference herein in its entirety.

TECHNICAL FIELD

The present disclosure relates generally to communication systems, and more particularly, to wireless communication including sounding reference signal (SRS) carrier switching. Aspects and features can enable and provide efficient wireless communication techniques, improved user experience, and wireless communication devices configured to perform improved SRS carrier switching with high data rates and improved processing times.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. In some aspects, the method may be performed at a user equipment (UE). The apparatus receives one or more sounding reference signal (SRS) transmission power control (TPC) configurations for one or more uplink carriers. In some cases, each or some of SRS TPC configurations can comprise a mapping from one uplink carrier to one or more component carrier (CC) sets. The apparatus may also determine a correspondence between each SRS TPC configuration and each uplink carrier. The apparatus receives a downlink control information (DCI). The DCI can comprise at least one of a request for SRS transmission on the one or more uplink carriers. Additionally and/or alternatively, the DCI can comprise or one or more transmission power control (TPC) commands for sounding reference signal (SRS) transmission. The SRS transmission may be on the one or more uplink carriers. The apparatus may also determine the one or more uplink carriers to which the at least one of the SRS request or the one or more TPC commands corresponds (e.g., at least based on the correspondence between the plurality of SRS TPC configurations and the plurality of uplink carriers). The apparatus can transmit the SRS on the one or more uplink carriers using the corresponding TPC command. The UE may perform, e.g., Type A SRS carrier switching.

In another aspect of the disclosure, a method, a computer-readable medium, and an apparatus are provided for wireless communication (e.g., at a UE and/or BS). The apparatus receives one or more SRS TPC configurations for a plurality of uplink carriers. Then, the apparatus receives DCI comprising at least one of a request for SRS transmission on one or more uplink carriers, or one or more TPC commands for SRS transmission on the one or more uplink carriers. The apparatus can determine the one or more uplink carriers to which the at least one of the SRS request or the one or more TPC commands corresponds at least based on starting bit information. Then, the apparatus transmits the SRS on the one or more uplink carriers using the corresponding TPC command. The UE may perform, e.g., Type B SRS carrier switching.

In another aspect of the disclosure, a method, a computer-readable medium, and an apparatus are provided for wireless communication (e.g., at a base station and/or UE). The apparatus can transmit (e.g., to a UE) a plurality of SRS TPC configurations for one or more uplink carriers. Each or some of the SRS TPC configurations may comprise a mapping from one uplink carrier to one or more CC sets. In some instances, a correspondence can be provided between each SRS TPC configuration and each uplink carrier. The apparatus can transmit DCI to the UE. The DCI can comprise at least one of a request for SRS transmission on one or more uplink carriers or one or more TPC commands for SRS transmission on the one or more uplink carriers. In some scenarios, at least one of the SRS request or the one or more TPC commands applies to an uplink carrier (e.g., at least based on a correspondence between one or more SRS TPC configurations and the one or more uplink carriers). The apparatus may then receive an SRS on the one or more uplink carriers in response to the corresponding TPC command. The base station may configure the UE to perform, e.g., Type A SRS carrier switching.

In another aspect of the disclosure, a method, a computer-readable medium, and an apparatus are provided for wireless communication (e.g., at a base station and/or UE). The apparatus can transmit (e.g., to a UE), one or more SRS TPC configurations for one or more uplink carriers and transmits DCI to the UE. The DCI can comprise at least one of a request for SRS transmission on the one or more uplink carriers, or one or more TPC commands for SRS transmission on the one or more uplink carriers. In some scenarios, a starting bit of each of the one or more TPC commands can indicate a correspondence to a corresponding uplink carrier from the plurality of carriers. The apparatus may receive the SRS on the one or more uplink carriers in response to the corresponding TPC command. The base station may configure the UE to perform, e.g., Type B SRS carrier switching.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, downlink channels within a 5G/NR subframe, a second 5G/NR frame, and uplink channels within a 5G/NR subframe, respectively, in accordance with some aspects of the present disclosure.

DETAILED DESCRIPTION

Figure 1:
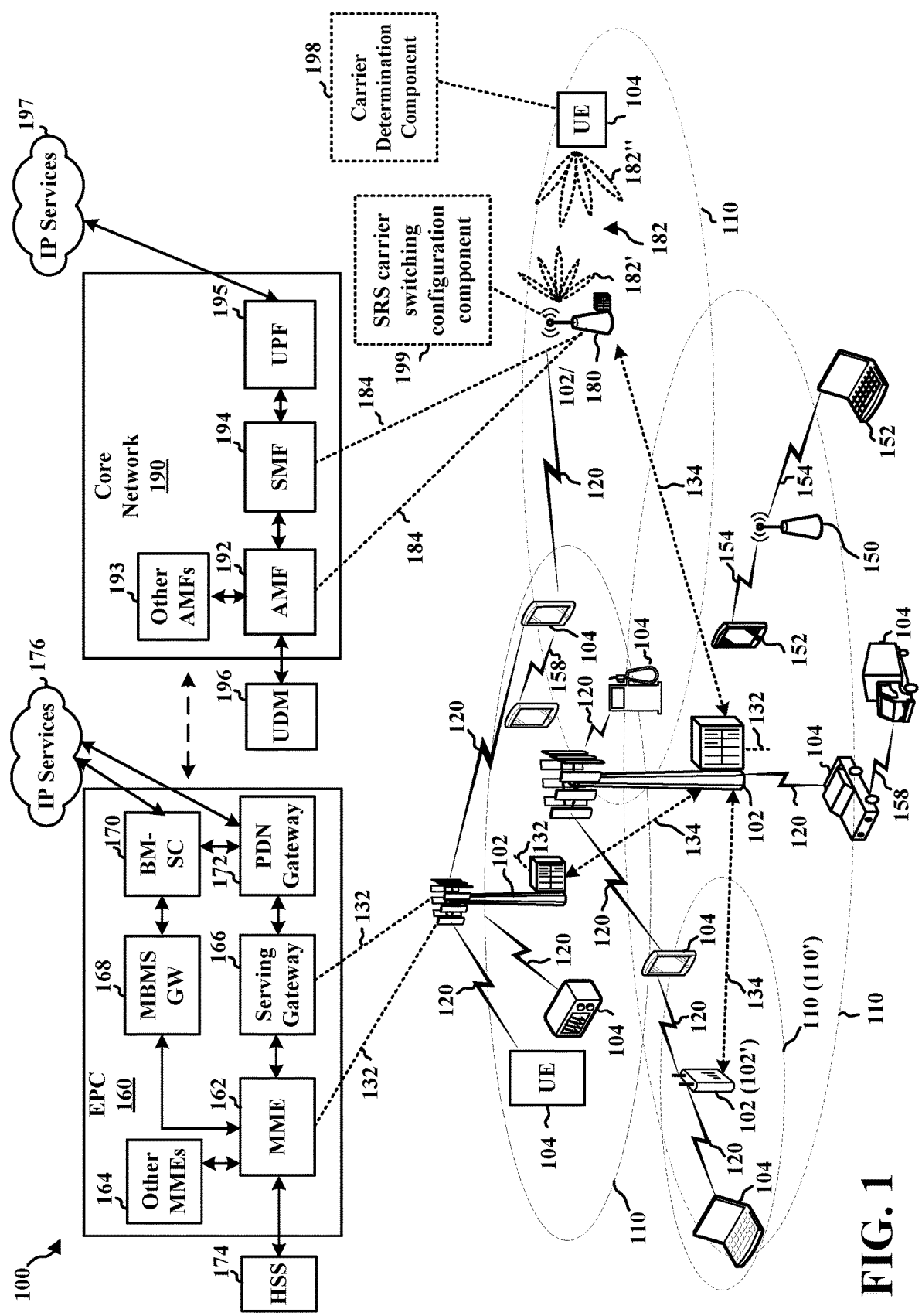
FIG. 1 is a diagram illustrating an example of a wireless communications system and an access network in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100 including UEs 104 and base stations 102 or 180. A base station 102/180 may configure a UE 104 for SRS carrier switching. Aspects presented herein enable a UE 104 receiving DCI from a monitoring cell that includes a request for SRS transmission and/or TPC command(s) for SRS transmission on a different uplink carrier to more accurately identify the uplink carrier to which the SRS request and/or TPC command apply. Carrier switching techniques and configurations may be pre-provisioned, may be device specific, may consider operational goals, and may be set out in standards. Techniques discussed herein may include a variety of carrier switching approaches and deployments.

In some examples, the UE 104 may be configured for Type A carrier switching, as described in more detail in connection with FIG. 4. The UE may include a carrier determination component 198. In some aspects, the carrier determination component 198 may be configured to receive a plurality of SRS TPC configurations for Type A SRS carrier switching. The SRS TPC configurations may be for a plurality of uplink carriers, where each SRS TPC configuration comprises a mapping from one uplink carrier to one or more CC sets. The carrier determination component 198 may be configured to determine a correspondence relation between each SRS TPC configuration and each uplink carrier. The UE 104 may receive, from a monitoring cell, DCI comprising at least one of a request for SRS transmission on one or more uplink carriers or one or more TPC commands for SRS transmission on the one or more uplink carriers. The carrier determination component 198 may be configured to determine the one or more uplink carriers from the plurality of carriers to which the at least one of the SRS request or the one or more TPC commands corresponds at least based on the correspondence relation between the plurality of SRS TPC configurations and the plurality of uplink carriers. Then, the UE 104 may transmit the SRS on the one or more uplink carriers using the corresponding TPC command.

Similarly, a base station 102 or 180 may include an SRS carrier switching configuration component 199 that configures the UE 104, e.g., for Type A SRS carrier switching. The SRS carrier switching configuration component 199 may be configured to transmit, to a UE, a plurality of SRS TPC configurations for a plurality of uplink carriers, wherein each SRS TPC configuration comprises a mapping from one uplink carrier to one or more CC sets, where a correspondence relation is provided between each SRS TPC configuration and each uplink carrier. The SRS carrier switching configuration component 199 may also be configured to transmit, on a monitoring cell, DCI to the UE comprising at least one of a request for SRS transmission on one or more uplink carriers or one or more TPC commands for SRS transmission on the one or more uplink carriers, where the at least one of the SRS request or the one or more TPC commands applies to an uplink carrier at least based on the correspondence relation between the plurality of SRS TPC configurations and the plurality of uplink carriers. Then, the base station 102 or 180 may receive the SRS on the one or more uplink carriers in response to the corresponding TPC command.

In some examples, the UE 104 may be configured for Type B carrier switching, as described in more detail in connection with FIG. 5. In this example, the carrier determination component 198 may be configured to receive a plurality of SRS TPC configurations for a plurality of uplink carriers. The carrier determination component 198 may be configured to receive, from a monitoring cell, DCI comprising at least one of a request for SRS transmission on one or more uplink carriers or one or more TPC commands for SRS transmission on the one or more uplink carriers. The carrier determination component 198 may be configured to determine the one or more uplink carriers from the plurality of carriers to which the at least one of the SRS request or the one or more TPC commands corresponds at least based on starting bit information. Then, the UE 104 may transmit the SRS on the one or more uplink carriers using the corresponding TPC command.

Similarly, the SRS carrier switching configuration component 199 may configure the UE 104, e.g., for Type B SRS carrier switching. In this example, the SRS carrier switching configuration component 199 may be configured to transmit, to a UE, a plurality of SRS TPC configurations for a plurality of uplink carriers, where each SRS TPC configuration comprises a mapping from one uplink carrier to one or more CC sets, where a correspondence relation is provided between each SRS TPC configuration and each uplink carrier. The SRS carrier switching configuration component 199 may be configured to transmit, on a monitoring cell, DCI to the UE comprising at least one of a request for SRS transmission on one or more uplink carriers or one or more TPC commands for SRS transmission on the one or more uplink carriers, wherein the at least one of the SRS request or the one or more TPC commands applies to an uplink carrier at least based on the correspondence relation between the plurality of SRS TPC configurations and the plurality of uplink carriers. Then, the base station 102 or 180 may receive the SRS from the UE 104 on the one or more uplink carriers in response to the corresponding TPC command.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink (DL) and uplink (UL) (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe.

As illustrated in FIGS. 2A-2D, the 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). The example description applies also to a 5G/NR frame structure that is TDD.

A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. FIGS. 2A-2D illustrate example aspects of a frame structure and example channels, e.g., for 5G NR. Other wireless communication technologies may have a different frame structure and/or different channels, and aspects disclosed herein are not limited in application to the frame structure in FIGS. 2A-2D.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
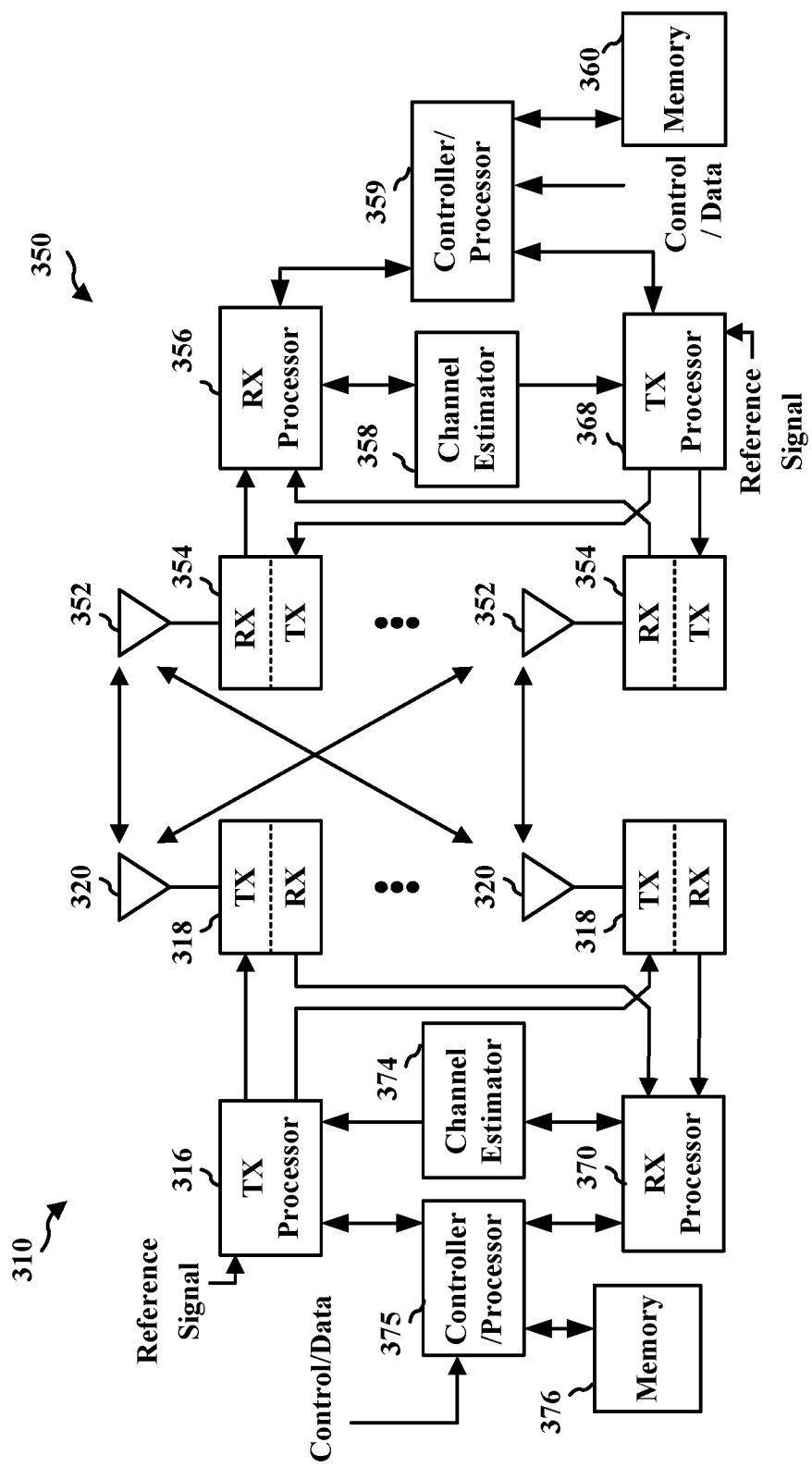
FIG. 3 is a diagram illustrating an example of a base station and user equipment (UE) in an access network in accordance with aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

A UE may transmit SRS that a base station may use to measure uplink channel characteristics, such as uplink channel quality. A base station may use measurements of the SRS transmitted by the UE to determine uplink scheduling, link adaptation, and/or some aspects of downlink scheduling. The base station may configure one or more parameters for the SRS transmission in RRC signaling to the UE. The UE may transmit the SRS using time and/or frequency resources, a transmission pattern, etc. based on the RRC configuration from the base station. The UE may receive a cell specific SRS configuration and/or UE specific SRS configuration. The cell specific configuration may indicate which subframes that a UE may use for SRS transmissions within the cell. The UE may support carrier aggregation (CA). The allocation of carriers may be asymmetric with respect to support for downlink and uplink (e.g., more or fewer carriers may be allocated for downlink communication than for uplink communication). The component carriers may include a primary component carrier and one or more secondary component carriers. A primary component carrier may be referred to as a primary cell (PCell) and a secondary component carrier may be referred to as a secondary cell (SCell). As used herein, the term carrier may be used interchangeably with the term "component carrier" or "CC." Additionally, the term "carrier" may be used to refer to a "cell."

A UE may be triggered in one carrier, e.g., a downlink carrier, to transmit an SRS in another carrier, e.g., an uplink carrier. In some scenarios, UEs may switch to another carrier to transmit the SRS. Switching from a first carrier on which an SRS is triggered to transmit the SRS on another carrier may be generally referred to as SRS carrier switching. Providing triggers in alternating or different carriers for receiving reference signals via one or more different carriers enables quick and efficient provision of reference signals. Various switching approaches can be implemented in accordance with techniques discussed herein.

As one specific example, a first carrier on which a UE receives a trigger may not include PUCCH and/or PUSCH. A base station may configure the UE for SRS carrier switching when PUSCH is not configured and/or independent SRS power control from that of PUSCH, for example.

In another specific example, a TPC command may be provided to the UE on one carrier for use on another carrier. The base station may configure the UE for different types of SRS carrier switching. For example, the base station may configure the UE for Type A SRS carrier switching and/or Type B SRS carrier switching. The base station may provide a parameter to the UE to indicate the type of SRS carrier switching.

In some aspects, a base station may configure a UE for Type A SRS carrier switching and/or Type B SRS carrier switching. For example, the base station may configure the UE with a higher layer parameter that indicates Type A or type B. One example of a parameter may include an SRS TPC PDCCH group to indicate Type A SRS carrier switching (e.g., srs-TPC-PDCCH-Group=typeA) or Type B SRS carrier switching (e.g., srs-TPC-PDCCH-Group=typeB).

Table 1 illustrates examples of SRS request fields that a base station may transmit and corresponding SRS resources that the request triggers for a UE for Type A and Type B SRS carrier switching. The specific parameter names shown in Table 1 are merely examples to illustrate disclosed concepts.

In some deployments, when a base station sends a set of TPC commands to a UE, the UE may not be able to determine which carrier corresponds to a particular TPC command. Aspects presented herein enable a UE to determine a correspondence relationship that enables the UE to determine a correspondence between a TPC command and a particular uplink carrier.

Type A Switching Example

For example, for Type A SRS carrier switching, the base station may configure the UE with a higher layer parameter that indicates whether the SRS carrier switching is Type A or Type B. One example of a parameter may include an SRS TPC PDCCH group, (e.g., srs-TPC-PDCCH-Group=typeA) to indicate Type A SRS carrier switching. The base station may configure the UE for type A SRS carrier switching for an uplink carrier without PUCCH and PUSCH or an uplink carrier on which the SRS power control is not tied with PUSCH power control. In a Type A configuration, the base station may provide one block that is configured for the UE by higher layers. The single block may include an SRS request and/or a set of one or more TPC commands. The SRS request may include 0 or 2 bits, e.g., SRS request field may or may not be present in the block that is transmitted to the UE. As an example, the block may include TPC command number 1, TPC command number 2, TPC command number 3, . . . , and so forth up to TPC command number N. Each TPC command may apply to a respective uplink carrier provided to the UE from the base station by a higher layer parameter. The higher layer parameter may indicate a set of CCs using an index (e.g., "cc-IndexInOneCC-Set"), which may indicate the CC index in one CC set for Type A SRS carrier switching. The base station may provide the field about the set of CCs (e.g., a cc-IndexInOneCC-Set) to the UE to indicate the CC index for one CC set when Type A SRS carrier switching configuration is indicated to the UE, e.g., when sending SRS carrier switching Type A configuration information (e.g., "srs-TPC-PDCCH-Group=type A") to the UE.

For Type A SRS carrier switching, the base station may provide the UE with an index for a set of serving cells (e.g., "cc-SetIndex") that includes indexes of serving cells in a set

TABLE 1

| Value of SRS request field | Type B: Triggered aperiodic SRS resource set(s) for DCI format 0_1, 1_1, and 2_3 configured with higher layer parameter | Type A: Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured with higher layer parameter aperiodicSRS-ResourceTrigger set to 1 | SRS resource set(s) configured with higher layer parameter usage in SRS-ResourceSet set to 'antennaSwitching' and resourceType in SRS-ResourceSet set to 'aperiodic' for a $1^{st}$ set of serving cells configured by higher layers |
| 10 | SRS resource set(s) configured with higher layer parameter aperiodicSRS-ResourceTrigger set to 2 | SRS resource set(s) configured with higher layer parameter usage in SRS-ResourceSet set to 'antennaSwitching' and resourceType in SRS-ResourceSet set to 'aperiodic' for a $2^{nd}$ set of serving cells configured by higher layers |
| 11 | SRS resource set(s) configured with higher layer parameter aperiodicSRS-ResourceTrigger set to 3 | SRS resource set(s) configured with higher layer parameter usage in SRS-ResourceSet set to 'antennaSwitching' and resourceType in SRS-ResourceSet set to 'aperiodic' for a $3^{rd}$ set of serving cells configured by higher layers | of serving cells that are provided by a parameter about a CC set (e.g., "cc-IndexInOneCC-Set"). The base station may send the UE a DCI field, e.g., a DCI format 2_3 field, that includes a TPC command for each serving cell from the set of serving cells and can also include an SRS request for SRS transmission on the set of serving cells.

As an example, for a particular uplink carrier, the base station may send a higher layer parameter for the uplink configuration (e.g., "UplinkConfig") that includes a carrier switching parameter (e.g., "carrierswitching") that indicates that the UE is configured for SRS carrier switching. The UE may be configured with a carrier to monitor for a trigger to transmit SRS on the uplink carrier. The carrier that is monitored by the UE for an SRS request and/or TPC command may be referred to as a "monitoring cell" or "monitoring carrier." The uplink carrier for which the base station is requesting the SRS may be referred to as the "target carrier" or "target cell." If the base station configures the UE for SRS carrier switching, the base station may send SRS carrier switching parameters to the UE, e.g., in an SRS carrier switching information element (IE) (e.g., "SRS-CarrierSwitching IE"). The SRS carrier switching IE may be used by the base station to configure the UE for SRS carrier switching, e.g., when PUSCH is not configured for a carrier and/or to provide independent SRS power control from that of the PUSCH for a carrier.

For each target carrier (which may be referred to interchangeably as a target cell), the SRS carrier switching IE may include an indication of a serving cell whose uplink transmission may be interrupted during SRS transmission on a PUSCH-less carrier (e.g., a PUSCH-less SCell) to transmit the SRS on the target carrier. The serving cell that can be interrupted may be indicated by the serving cell index (e.g., in a "SRS-SwitchFromServCellIndex" parameter). For the target carrier, the base station may also send an indication of the SRS carrier switching type (e.g., Type A or Type B). For Type A SRS carrier switching, the base station may send an SRS TPC PDCCH group configuration (e.g., srs-TPC-PDCCH-Group) that includes a sequence of SRS-TPC-PDCCH-configurations. In contrast, for Type B SRS carrier switching, the base station may send a single srs-TPC-PDCCH-Group configuration. For each target carrier, the base station may configure the UE to monitor one or more other carriers for an SRS request and/or TPC command. The indicated carriers may be referred to as the monitoring carriers or monitoring cells. The UE will monitor the indicated monitoring cell for DCI from the base station with an SRS request or TPC command for the target carrier. For Type A SRS carrier switching, the sequence of SRS-TPC-PDCCH configurations may include an index for a set of CCs (e.g., an "srs-CC-SetIndexList"). For the index(es) for a set of CCs, the base station may further indicate an index for the CC set (e.g., a "cc-SetIndex") and an indication of the CC index in one CC set for Type A (e.g., a "cc-IndexInOneCC-Set"). The base station may configure the SRS carrier switching parameters for the UE, e.g., in RRC signaling.

Figure 4:
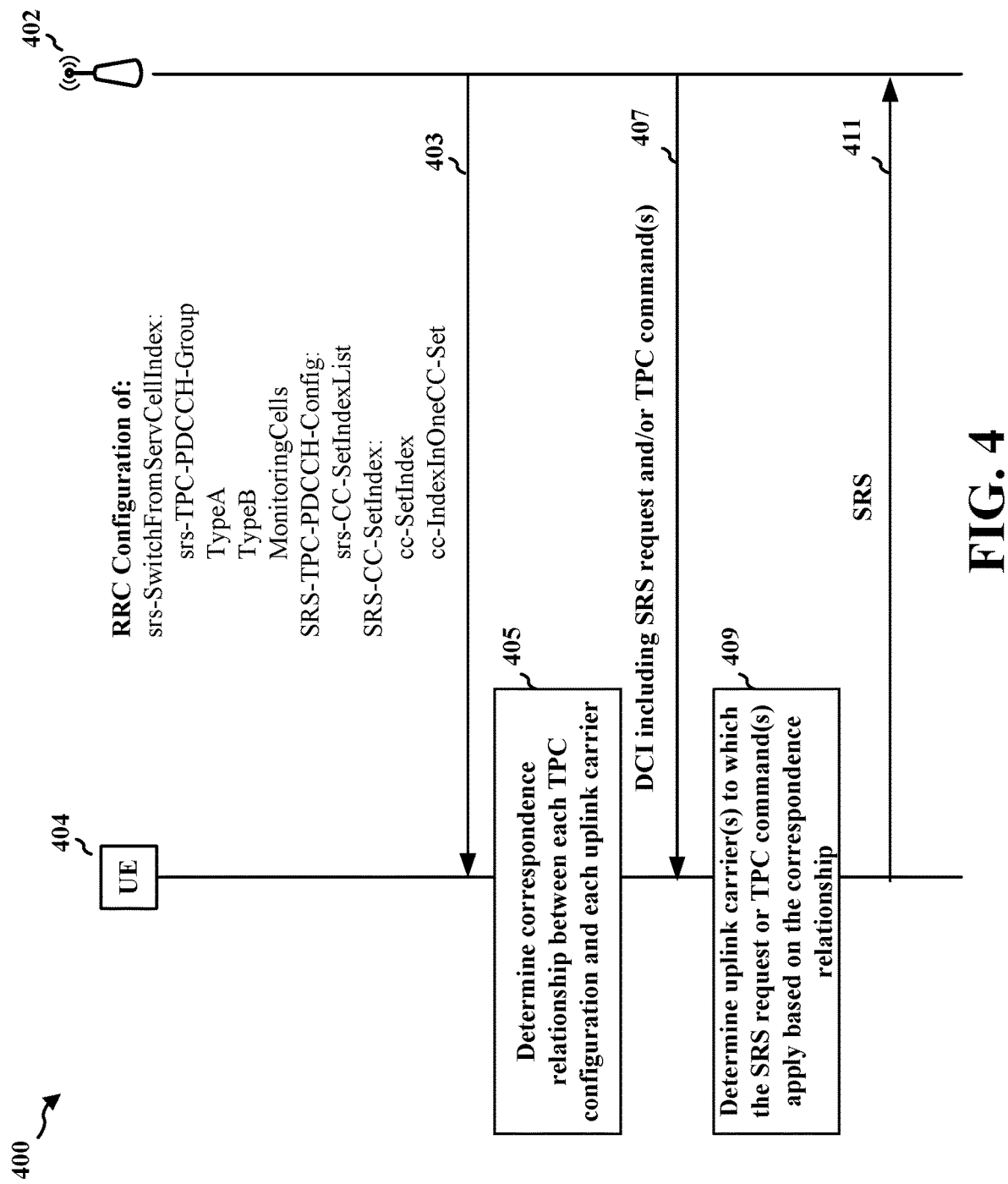
FIG. 4 is an example communication flow between a UE and a base station including SRS carrier switching in accordance with aspects of the present disclosure.

FIG. 4 illustrates an example communication flow 400 between a base station 402 and a UE 404 including Type A SRS carrier switching. As illustrated at 403, the base station may configure the UE for SRS carrier switching for at least one target carrier. Each target carrier may comprise an uplink carrier. For each target carrier, the base station may send an RRC configuration including an indication of the carrier to be interrupted for the transmission of the SRS ("SRS-SwitchFromServCellIndex"), SRS carrier switching type (e.g., Type A/Type B), an indication of one or more monitoring cells to monitor for DCI with an SRS request or TPC command for the target carrier, an SRS TPC PDCCH configuration (e.g., "SRS-TPC-PDCCH-Config") including an index for a set of CCs (e.g., "srs-CC-SetIndexList"), an indication of the CC index in one CC set for Type A (e.g., "ss-IndexInOneCC-Set"), and/or an indication of a CC set index for Type A (e.g., "cc-SetIndex").

As illustrated at 405, the UE may use the RRC configuration 403 to determine a correspondence relationship between each SRS TPC configuration and each uplink carrier (e.g., each target carrier).

The base station 402 may send DCI 407 to the UE 404 including a request for an SRS transmission on a target carrier and/or a TPC command for SRS transmission on a target carrier. The DCI may be based, for example, on DCI format 2_3. As an example, the DCI 407 may include a sequence of TPC commands, e.g., TPC command number 1, TPC command number 2, TPC command number 3, . . . , and so forth up to TPC command number N. Each TPC command may apply to a respective uplink carrier (e.g., target carrier) in a CC set, e.g., provided by a higher layer parameter, such as cc-IndexInOneCC-Set.

At 409, the UE determines which of the configured SRS TPC PDCCH configurations (e.g., "srs-TPC-PDCCH-Config") are triggered by the DCI and to which target carriers the DCI applies. The DCI may indicate a cc Set index, and the UE may have identified at 405 which of the target carrier configurations include the indicated CC set index. The UE may store or otherwise maintain the corresponding index in one CC value. Then, at 409, the UE may determine that k-th TPC command included in the DCI, would be applied to the carrier "i" whose typeA[i] included a sub-element with cc Set Index that corresponds to the indicated CC set index and had cc-IndexInOneCC-Set=k.

The UE may identify the "ith" carrier in any of a number of different ways. In a first example, the typeA[i] carrier may correspond to the i-th configured serving cell. Thus, the determination may be based on a relative order of configured serving cells. The configured serving cells may be ordered based on increasing cell index, and the TPC commands may be applied in order to the ordered, configured serving cells. In this first example, the number of SRS TPC PDCCH configurations configured by type A may be equal to the number of configured serving cells.

In a second example, the typeA[i] carrier may correspond to the carrier that has a serving cell index (e.g., "servCellIndex") equal to i. Thus, this second example may use an absolute correspondence to a serving cell index (e.g., an ith serving cell), whereas the first example used a relative correspondence.

In a third example, the typeA[i] carrier may correspond to the i-th serving cell that is configured to monitor the monitoring cell that carried the DCI, when ordered by increasing serving cell index. Thus, when receiving the DCI 407 on the monitoring cell, the UE may first determine which target carriers are configured to monitor the monitoring cell for SRS carrier switching DCI. Then, the UE may apply the TPC commands in the DCI in order to the ordered subset of target carriers that monitor the monitoring cell.

In the first example, if the UE receives a sequence of SRS requests and/or TPC commands for Type A SRS carrier switching in DCI 407 comprising typeA[0], typeA[1], typeA[2], and the UE is configured with serving cell indexes/carrier index {0, 10, 20}, the typeA[0] SRS request/TPC command is for carrier index 0, the typeA[1] SRS request/TPC command is for carrier index 10, and the typeA[2] SRS request/TPC command is for carrier index 20. For example, TPC command number 1, TPC command number 2, . . . , TPC command number N, may be applied where each TPC command applies to a respective UL carrier provided by higher layer parameter cc-IndexInOneCC-Set, such that the number of SRS-TPC-PDCCH-Config configured by typeA inside the SRS-CarrierSwitching IE equals to the number of configured serving cells, and the i-th SRS-TPC-PDCCH-Config corresponds to the i-th configured serving cell.

In the second example, if the UE is configured with serving cell indexes/carrier indexes {0, 10, 20}, the DCI may include typeA[0] SRS request/TPC command for carrier index 0, typeA[1] SRS request/TPC command that includes dummy information for carrier index 1, and typeA[2] SRS request/TPC command that includes dummy information for carrier index 2. Similar dummy information may be provided for carrier indexes 3-9. The typeA[10] SRS request/TPC command corresponds to carrier index 10, with dummy information for carrier indexes 11-19. The typeA[20] SRS request/TPC command corresponds to carrier index 20.

In the third example, if the UE identified the subset of target carriers that are configured to monitor the carrier on which the DCI was received to be {1, 5, 20}, the typeA[0] SRS request/TPC command is for carrier index 1, the typeA[1] SRS request/TPC command is for carrier index 5, and the typeA[2] SRS request/TPC command is for carrier index 20.

The UE 404 may use the corresponding SRS request and/or TPC command from the DCI 407 to transmit the SRS 411 on the corresponding target carrier identified at 409.

Type B Switching Example

If the UE is configured with the higher layer parameter indicating Type B SRS carrier switching (e.g., "srs-TPC-PDCCH-Group=typeB") for an uplink carrier/target carrier without PUCCH and PUSCH or an uplink carrier/target carrier on which the SRS power control is not tied with PUSCH power control, one block or multiple blocks may be configured for the UE by higher layers where each block applies to an UL carrier. Each block includes an SRS request and/or a TPC command. If present, the SRS request may comprise two bits. If present, the TPC command may comprise two bits. In contrast to Type A, which includes a single block with a sequence of TPC commands, in Type B, the base station transmits one or more blocks, where each block include only a single TPC command. Thus, each block applies to a single target carrier. For example, a DCI format 2_3 field may include a TPC command for a serving cell index and can also include an SRS request for SRS transmission on the serving cell.

Aspects presented herein enable the UE to determine which block applies to a particular target carrier. For a Type B DCI, the UE may use starting bit information about a block to determine the target carrier to which a particular block applies.

Figure 5:
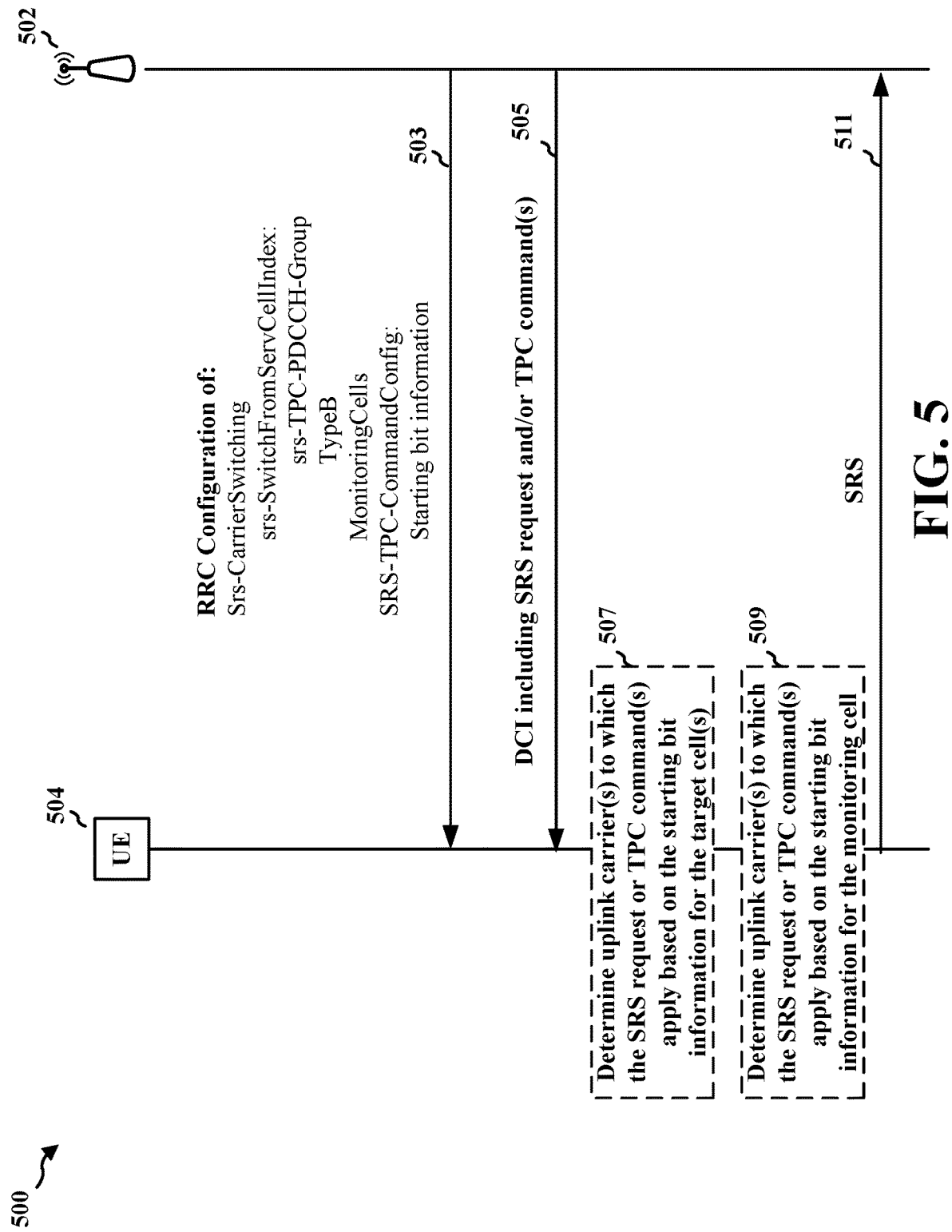
FIG. 5 is an example communication flow between a UE and a base station including SRS carrier switching in accordance with aspects of the present disclosure.

FIG. 5 illustrates an example communication flow 500 between a base station 502 and a UE 504 including Type B SRS carrier switching. As illustrated at 503, the base station may configure the UE for SRS carrier switching for at least one target carrier. Each target carrier may comprise an uplink carrier. Along with the RRC configuration, the base station 502 may provide starting bit information that the UE uses to determine a correspondence between a particular block of DCI and a target carrier.

The RRC configuration 503 may include similar information to the RRC configuration 403, with the addition of the starting bit information, and without the CC set information.

The base station 502 sends DCI 505 to the UE 504 including a Type B SRS switching request for an SRS transmission on a target carrier and/or a TPC command for SRS transmission on a target carrier. The DCI may be based, for example, on DCI format 2_3. The DCI may include one or more blocks, each block including an SRS request and/or TPC command for a single target carrier. The UE 504 may use starting bit information for the block(s) of the DCI 505 to determine the target carrier to which a particular SRS request or TPC command applies.

In a first example, at 507, the UE 504 may use starting bit information for each of the target cells to determine which block of the DCI corresponds to each of the target cells.

If each target cell_has been configured with starting bit information (e.g., a "startingBitOfFormat2-3") in a TPC SRS configuration (e.g., "tpc-SRS") in a PDCCH configuration (e.g., "PDCCH-Config"), at 503, the starting bit information may be used to index the blocks for a particular monitoring cell, e.g., of the target cells that are configured to monitor the monitoring cell on which the DCI is received. The starting bit information may be configured independent of whether this cell is a monitoring cell of DCI format 2_3 or not.

A UE may not expect to receive a configuration of two different cells with different Carrier Switching Types (e.g., Type A and Type B) and having a same configured monitoring cell (e.g., in their "monitoringCells" configuration). Thus, when DCI is received on a particular monitoring cell, the UE may apply it for either Type A configured carriers or Type B configured carriers, but not for both types.

When the UE receives a DCI format 2_3, e.g., DCI 505, in a monitoring cell X, the UE 504 may sweep through the cells which have the cell X configured as a monitoring cell on which DCI may be received. The UE may determine that the monitoring cell is a monitoring cell for Type-A or Type-B SRS carrier switching.

If the monitoring cell is for Type-B, the UE 504 may use the starting bit information (e.g., "startingBitOfFormat2-3") configured within each target carrier to map the block to the corresponding target carrier. The starting bit information may be, e.g., up to 32 bits, so up to 8 cells with 4 bits per block can be configured.

This determination, at 507 is different for Type B than for a Type A determination, at 409. For example, target carrier 1 and target carrier 2 may both have carrier 0 as a monitoring cell. In Type A, the UE may use the starting bit information configured in carrier 0 to find the starting bit of the single block containing commands for both target carrier 1 and target carrier 2 within the DCI received in carrier 0. In contrast, in this first example for Type B, the UE may use the respective starting bit information configured for target carrier 1 and target carrier 2 to find the starting bit of the block corresponding to target carrier 1 and target carrier 2, respectively, within the DCI received in carrier 0.

In a second example for Type B SRS switching, at 509, the UE 504 may determine the uplink carriers to which the SRS request or TPC command(s) apply based on starting bit information configured for the monitoring cell. The starting bit information configured at 503 (e.g., "startingBitOfFormat2-3") may be configured in the monitoring cell. At 509, the UE may use the starting bit information configured for the monitoring cell to find the starting bit of the first block within the DCI 505 containing commands for multiple target cells. The DCI may include one or more consecutive blocks of SRS requests/TPC commands. If the UE receives a DCI (e.g., DCI format 2_3) in the monitoring cell X, the UE sweeps through the target cells which have the cell X configured as a monitoring cell. For example, if target cells for carrier 1, carrier 3, carrier 5, and carrier 7 are each configured to monitor for DCI on the cell on which the DCI 505 is received, then the UE may map each consecutive block, starting from the block indicated by the starting bit information of the monitoring cell, to the ordered subset of target carriers, e.g., the ith CC ordered in increasing serving cell index (i.e. carrier 1, carrier 3, carrier 5, carrier 7).

The UE 504 may use the corresponding SRS request and/or TPC command from the DCI 505 to transmit the SRS 511 on the corresponding target carrier identified at 507 or 509.

Figure 6:
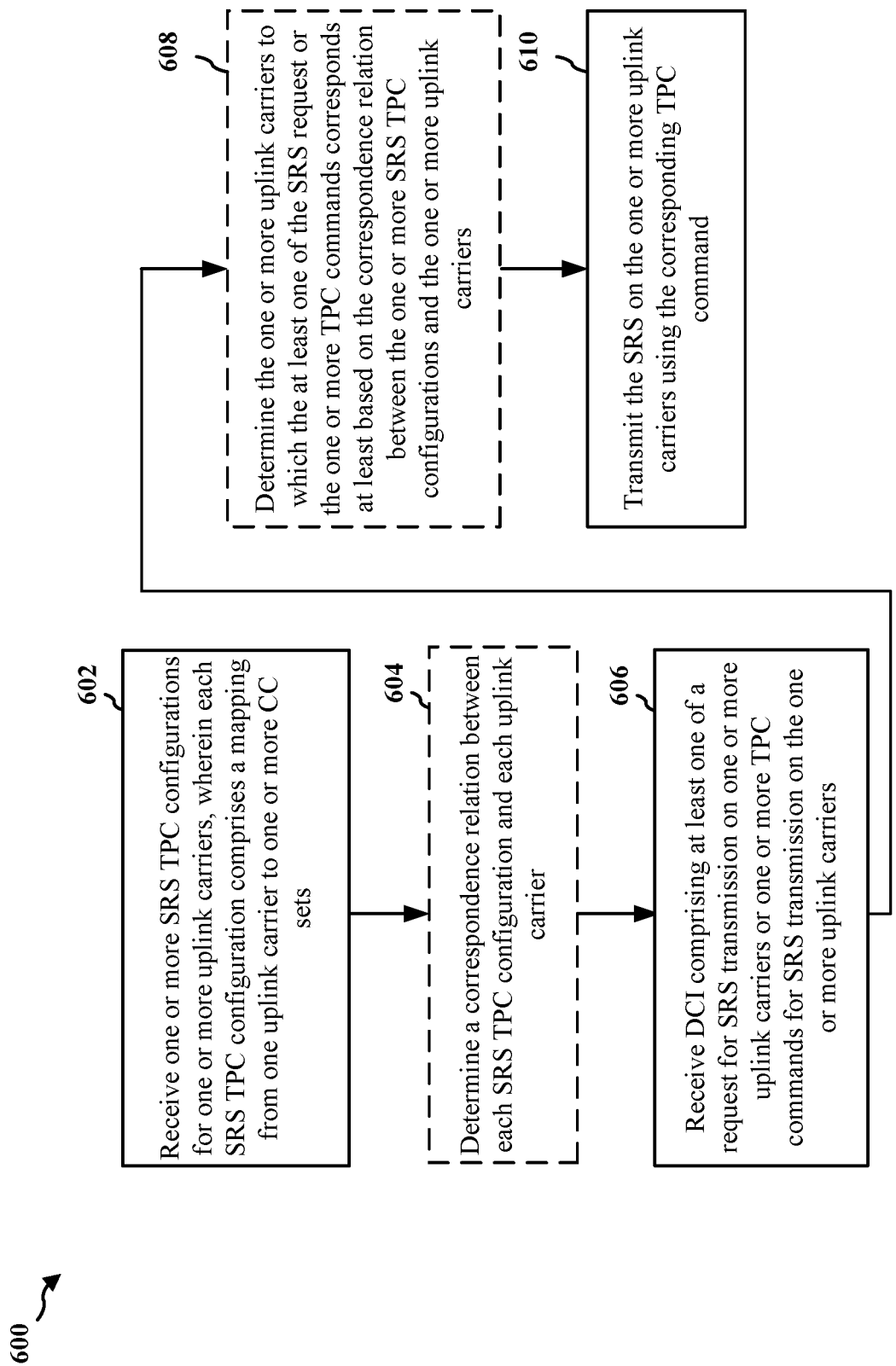
FIG. 6 is a flowchart of a method of wireless communication at a UE including SRS carrier switching in accordance with aspects of the present disclosure.

FIG. 6 is a flowchart 600 of a method of wireless communication. The method may be performed by a UE or a component of a UE (e.g., the UE 104, 350, 404, 504; the apparatus 1002; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to determine a correspondence between an SRS request and/or TPC command received in DCI and a target carrier for Type A SRS carrier switching. For Type A SRS carrier switching, the DCI (e.g., which may be DCI format 2_3) may indicate an index for a set of serving cells is provided by cc-SetIndex, indexes of serving cells in the set of serving cells are provided by cc-IndexInOneCC-Set, and a DCI format 2_3 field includes a TPC command for each serving cell from the set of serving cells and can also include an SRS request for SRS transmission on the set of serving cells.

At 602, the UE receives one or more SRS TPC configurations for one or more uplink carriers, wherein each SRS TPC configuration comprises a mapping from one uplink carrier to one or more CC sets. In some aspects, the UE may receive a plurality of SRS TPC configurations for a plurality of uplink carriers, wherein each SRS TPC configuration comprises a mapping from one uplink carrier to one or more CC sets. The reception of the plurality of SRS TPC configurations may be performed, e.g., by the SRS TPC component 1040 of the apparatus 1002 in FIG. 10. The configuration may be for Type A SRS carrier switching, e.g., as described in connection with FIG. 4. The configuration may correspond to the RRC configuration 403 in FIG. 4. The UE may receive the SRS TPC configurations in RRC signaling from the base station. The UE may further receive a configuration for SRS carrier switching. The UE may receive a configuration indicating Type A SRS carrier switching, for example.

At 604, the UE may determine a correspondence between each SRS TPC configuration and each uplink carrier. In some aspects, the correspondence may also be referred to as a correspondence relation or a relationship. The determination may include any of the aspects described in connection with 405 in FIG. 4. The determination may be performed, e.g., by the correspondence component 1042 of the apparatus 1002 in FIG. 10.

At 606, the UE receives DCI comprising at least one of a request for SRS transmission on one or more uplink carriers or one or more TPC commands for SRS transmission on the one or more uplink carriers. In some aspects, the DCI may be received from a monitoring cell, for example. The one or more TPC commands may be received for Type A SRS carrier switching, e.g., as described in connection with 407 in FIG. 4. For example, the DCI may comprise a particular format, such as DCI format 2_3. In some aspects, the UE may receive the DCI on a different carrier than a carrier on which the UE will transmit the SRS transmission. The reception of the DCI may be performed, e.g. by the DCI component 1044 of the apparatus 1002 in FIG. 10.

At 608, the UE may determine the one or more uplink carriers, e.g., from a plurality of carriers, to which the at least one of the SRS request or the one or more TPC commands corresponds at least based on the correspondence between the one or more SRS TPC configurations and the one or more uplink carriers. In some aspects, the UE may determine the one or more uplink carriers based on the correspondence between the plurality of SRS TPC configurations and the plurality of uplink carriers. The determination may be based, e.g., on the RRC configuration of SRS switching parameters (e.g., RRC configuration 403) and the information in the DCI (e.g., DCI 407). The determination may include aspects described in connection with 409 in FIG. 4. The determination of the uplink carrier(s) may be performed, e.g. by the uplink carrier component 1046 of the apparatus 1002 in FIG. 10.

In a first example, the determination of the correspondence relation between each SRS TPC configuration and each uplink carrier, at 608 may include relating an i-th SRS TPC configuration to an i-th configured serving cell when ranked in an increasing order of serving cell index. The UE may apply a corresponding TPC command to an uplink carrier when transmitting the SRS, e.g., at 610.

In a second example, the determination of the correspondence relation between each of the one or more SRS TPC configurations and each of the plurality of uplink carriers, at 608, may include relating an i-th SRS TPC configuration to a serving cell with a serving cell index "i" and applying the one or more TPC commands to the one or more uplink carriers based on a serving cell index.

In a third example, the UE may determine a subset of carriers configured to receive command for SRS transmission or TPC command from the monitoring cell. The determination of the correspondence between each SRS TPC configuration and each uplink carrier, at 608, may include relating an i-th SRS TPC configuration to an i-th uplink carrier of the subset of carriers when ranked in an increasing order of serving cell index.

The UE may determine that each TPC command applies to a respective uplink carrier provided by a higher layer parameter indicating a CC index in a CC set for Type A, such that a number of SRS TPC PDCCH configurations (e.g., "SRS-TPC-PDCCH-Config") configured by Type A inside an SRS carrier switching IE equals to a number of configured serving cells, and an i-th SRS TPC PDCCH configuration corresponds to an i-th configured serving cell. Thus, the UE may receive the higher layer parameter indicating a CC index in the CC set for the type A SRS carrier switching. For example, a number of the plurality of SRS TPC configurations configured for the Type A SRS carrier switching inside the SRS carrier switching IE(s) equals a number of configured serving cells, and the transmission of the SRS on the one or more uplink carriers, at 610, may include applying each TPC command received in the DCI to a respective uplink carrier provided by a higher layer parameter such that an i-th SRS TPC configuration corresponds to an i-th configured serving cell for the UE. In some aspects, the UE may receive one SRS carrier switching IE, and the number of the plurality of SRS TPC configurations configured for the Type A SRS carrier switching inside the SRS carrier switching IE may equal a number of configured serving cells. The concept may also be applied for multiple SRS carrier switching IEs. Thus, in some aspects, the UE may receive multiple SRS carrier switching IEs, and the number of the plurality of SRS TPC configurations configured for the Type A SRS carrier switching inside the SRS carrier switching IEs may equal a number of configured serving cells.

At 610, the UE transmits, in response to receiving the DCI at 606, the SRS on the one or more uplink carriers, e.g., from the plurality of uplink carriers configured at 602, using the corresponding TPC command. For example, the UE may transmit the SRS on uplink carrier(s) based on a correspondence relation between the plurality of SRS TPC configurations and the plurality of uplink carriers. The transmission of the SRS may include aspects described in connection with the SRS 411 in FIG. 4. The transmission of the SRS may be performed, e.g. by the SRS component 1048 of the apparatus 1002 in FIG. 10. In some aspects, the UE may switch from a carrier on which the DCI was received to the one or more uplink carriers, determined at 608, to transmit the SRS.

For example, transmitting the SRS on the one or more uplink carriers may include applying each TPC command received in the DCI to a respective uplink carrier provided by a higher layer parameter such that an i-th SRS TPC configuration corresponds to an i-th configured serving cell for the UE in a CC set for the type A SRS carrier switching. A number of the plurality of SRS TPC configurations configured for Type A inside an SRS carrier switching IE may equal a number of configured serving cells, for example. In some aspects, the UE may further receive the higher layer parameter indicating a CC index in the CC set for the type A SRS carrier switching. As described in connection with 608, in transmitting the SRS, the UE may apply each TPC command to a respective uplink carrier provided by a higher layer parameter indicating a CC index in a CC set for Type A, such that a number of SRS TPC PDCCH configurations (e.g., SRS-TPC-PDCCH-Configuration) configured for Type A inside an SRS carrier switching IE equals a number of configured serving cells, and an i-th SRS-TPC-PDCCH-Configuration corresponds to an i-th configured serving cell.

In other aspects, the UE may transmit the SRS based on correspondence relation between each SRS TPC configuration and each uplink carrier comprises relating an i-th SRS TPC configuration to an i-th configured serving cell when ranked in an increasing order of serving cell index, e.g., as described in connection with 608.

In other aspects, the UE may transmit the SRS based on a correspondence relation between each of the plurality of SRS TPC configurations and each of the plurality of uplink carriers comprises relating an i-th SRS TPC configuration to a serving cell with a serving cell index "i", where the UE transmits the SRS by applying the one or more TPC commands to the one or more uplink carriers based on the serving cell index.

Figure 7:
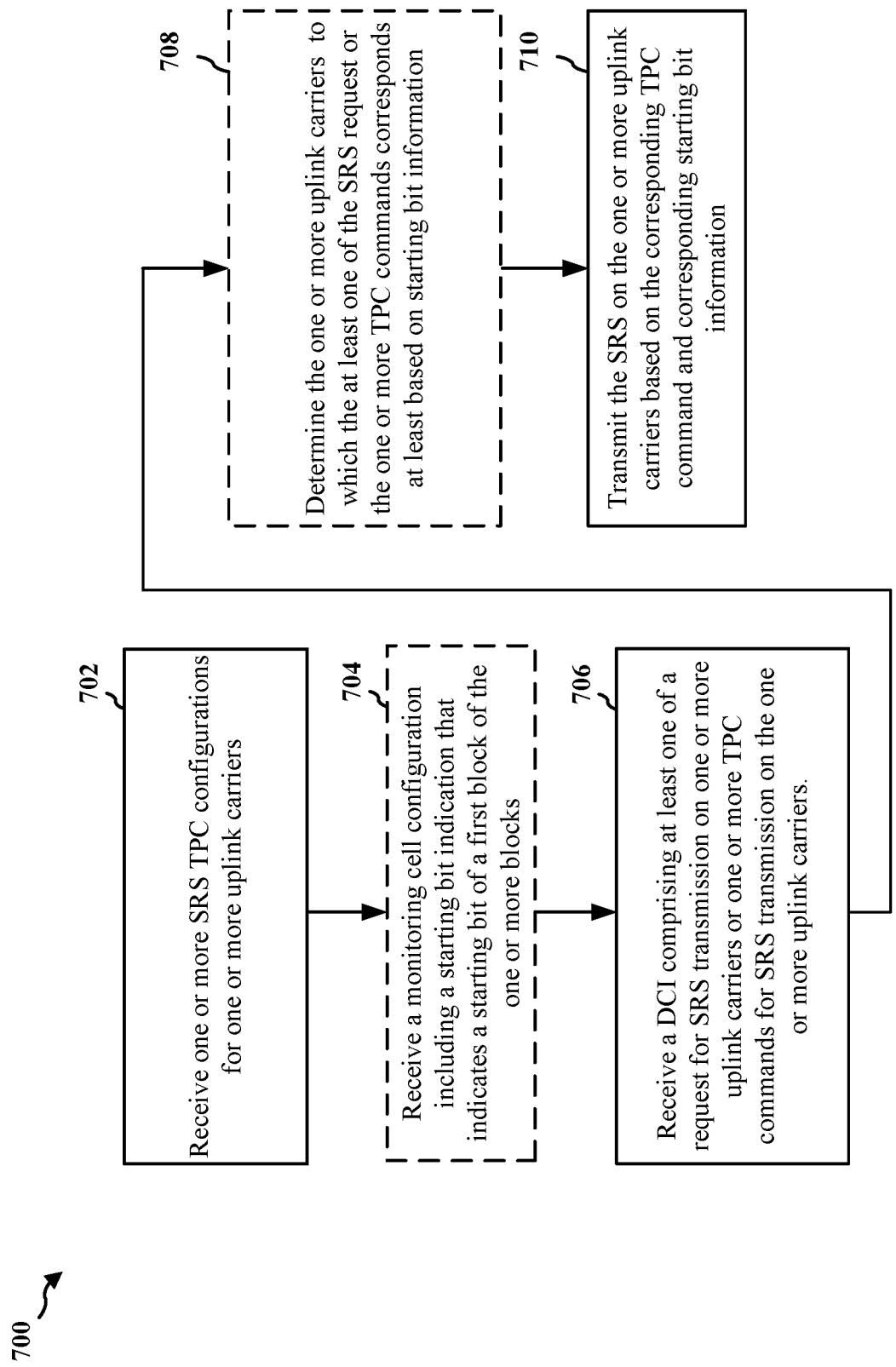
FIG. 7 is a flowchart of a method of wireless communication at a UE including SRS carrier switching in accordance with aspects of the present disclosure.

FIG. 7 is a flowchart 700 of a method of wireless communication. The method may be performed by a UE or a component of a UE (e.g., the UE 104, 350, 404, 504; the apparatus 1002; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to determine a correspondence between an SRS request and/or TPC command received in DCI and a target carrier for Type B SRS carrier switching. For Type B SRS carrier switching, the DCI (e.g., which may be DCI format 2_3, may include a TPC command for a serving cell index and can also include an SRS request for SRS transmission on the serving cell.

At 702, the UE receives one or more SRS TPC configurations for one or more uplink carriers. In some aspects, the UE may receive a plurality of SRS TPC configurations for a plurality of uplink carriers. The configuration may be for Type B SRS carrier switching, e.g., as described in connection with FIG. 5. The configuration may correspond to the RRC configuration 503 in FIG. 5. The reception of the one or more SRS TPC configurations may be performed, e.g., by the SRS TPC component 1040 of the apparatus 1002 in FIG. 10.

At 706, the UE receives, from a monitoring cell, a DCI comprising at least one of a request for SRS transmission on one or more uplink carriers or one or more TPC commands for SRS transmission on the one or more uplink carriers. The reception of the DCI may be performed, e.g. by the DCI component 1044 of the apparatus 1002 in FIG. 10. The DCI may include aspects described in connection with the DCI 505 in FIG. 5. The one or more TPC commands may be received for Type B SRS carrier switching in control signaling comprising one or more blocks, each block comprising a TPC command for an uplink carrier. The UE may not expect to receive the configuration of two different uplink cells with different carrier switching types and having a same configured monitoring cell. For example, the DCI may comprise a particular format, such as DCI format 2_3. In some aspects, the UE may receive the DCI on a different carrier than a carrier on which the UE will transmit the SRS transmission.

At 708, the UE may determine the one or more uplink carriers, e.g., from a plurality of carriers, to which the at least one of the SRS request or the one or more TPC commands corresponds at least based on starting bit information. The SRS TPC configuration for each of the one or more uplink carriers may include a starting bit indication that indicates a starting bit of a corresponding block within the one or more blocks, e.g., as described in connection with 507 in FIG. 5. The determination of the uplink carrier(s) may be performed, e.g. by the uplink carrier component 1046 of the apparatus 1002 in FIG. 10.

At 704, the UE may receive a monitoring cell configuration including a starting bit indication that indicates a starting bit of a first block of the one or more blocks. The UE may apply the TPC commands to the one or more uplink carriers based on a mapping between a consecutive order of the one or more blocks and an order of a subset of cells configured to receive SRS information from the monitoring cell, e.g., as described in connection with 509 in FIG. 5. The order of the subset of cells may be based on an increasing order of serving cell indexes for the subset of cells. The reception of the starting bit indication may be performed by the starting bit indication component 1050

At 710, the UE transmits the SRS on the one or more uplink carriers, e.g., from a plurality of uplink carriers, using a corresponding TPC command and starting bit information. The correspondence between the TPC command and the uplink carrier(s) may be determined based on any of the aspects described in connection with 708. The transmission of the SRS may include aspects described in connection with the SRS 511 in FIG. 5. The transmission of the SRS may be performed, e.g. by the SRS component 1048 of the apparatus 1002 in FIG. 10. In some aspects, the UE may switch from a carrier on which the DCI was received to the one or more uplink carrier(s), determine at 708, to transmit the SRS.

An apparatus may include additional components that perform each of the blocks of the algorithm in the flowcharts of FIG. 6, FIG. 7, and/or aspects performed by the UEs in FIGS. 4 and/or 5. As such, each block in the flowcharts of FIG. 6, FIG. 7, and/or aspects performed by the UEs in FIGS. 4 and/or 5, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
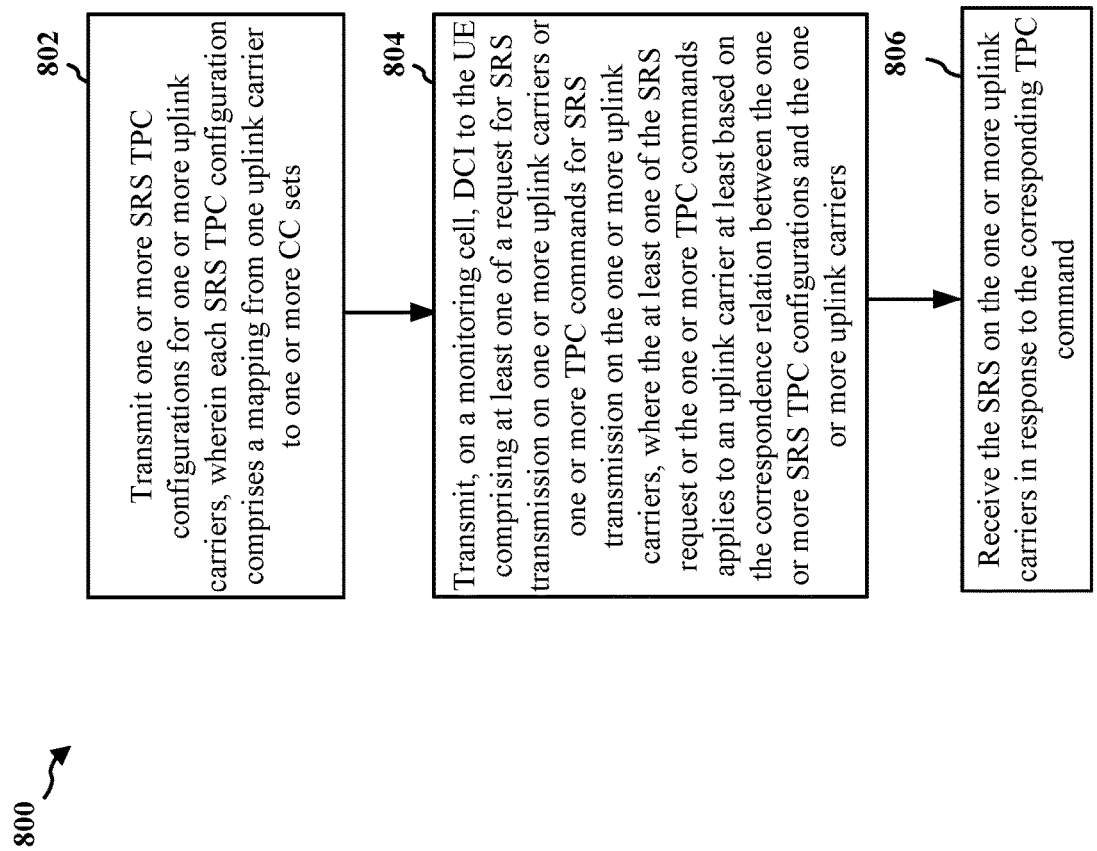
FIG. 8 is a flowchart of a method of wireless communication at a base station including SRS carrier switching in accordance with aspects of the present disclosure.

FIG. 8 is a flowchart 800 of a method of wireless communication. The method may be performed by a base station or a component of a base station (e.g., the base station 102, 180, 310, 402, 502; the apparatus 1102; a processing system, which may include the memory 376 and which may be the entire base station 310 or a component of the base station 310, such as the TX processor 316, the RX processor 370, and/or the controller/processor 375). The method may enable the base station to indicate a correspondence between an SRS request and/or TPC command received in DCI and a target carrier for Type A SRS carrier switching. For Type A SRS carrier switching, the DCI (e.g., which may be DCI format 2_3) may indicate an index for a set of serving cells is provided by cc-SetIndex, indexes of serving cells in the set of serving cells are provided by cc-IndexInOneCC-Set, and a DCI format 2_3 field includes a TPC command for each serving cell from the set of serving cells and can also include an SRS request for SRS transmission on the set of serving cells.

At 802, the base station transmits to a UE one or more SRS TPC configurations for one or more uplink carriers, wherein each SRS TPC configuration comprises a mapping from one uplink carrier to one or more CC sets. In some aspects, the base station may transmit a plurality of SRS TPC configurations for a plurality of uplink carriers, wherein each SRS TPC configuration comprises a mapping from one uplink carrier to one or more CC sets. The configuration may be for Type A SRS carrier switching, e.g., as described in connection with FIG. 4. The configuration may correspond to the RRC configuration 403 in FIG. 4. The transmission of the SRS TPC configurations may be performed, e.g., by the SRS TPC configuration component 1140 of the apparatus 1102 in FIG. 11.

At 804, the base station transmits DCI to the UE comprising at least one of a request for SRS transmission on one or more uplink carriers or one or more TPC commands for SRS transmission on the one or more uplink carriers, where the at least one of the SRS request or the one or more TPC commands applies to an uplink carrier at least based on the correspondence relation between the plurality of SRS TPC configurations and the plurality of uplink carriers. In some aspects, the base station may transmit the DCI on a monitoring cell for the UE. The one or more TPC commands may be transmitted for Type A SRS carrier switching, e.g., as described in connection with 407 in FIG. 4. The transmission of the DCI may be performed, e.g., by the DCI component 1142 of the apparatus in FIG. 11.

The correspondence may be based, e.g., on the RRC configuration of SRS switching parameters (e.g., RRC configuration 403) and the information in the DCI (e.g., DCI 407).

In a first example, the correspondence between each SRS TPC configuration and each uplink carrier may relate an i-th SRS TPC configuration to an i-th configured serving cell when ranked in an increasing order of serving cell index, wherein the transmitting device applies a corresponding TPC command to an uplink carrier when transmitting the SRS.

In a second example, the correspondence relation between each of the plurality of SRS TPC configurations and each of the one or more uplink carriers may relate an i-th SRS TPC configuration to a serving cell with a serving cell index "i" and applying the one or more TPC commands to the one or more uplink carriers based on a serving cell index, e.g., as described in connection with FIG. 4 and/or FIG. 6.

In a third example, a subset of carriers may be configured to receive command for SRS transmission or TPC command from the monitoring cell and the correspondence relation between each SRS TPC configuration and each uplink carrier may relate an i-th SRS TPC configuration to an i-th uplink carrier of the subset of carriers when ranked in an increasing order of serving cell index, e.g., as described in connection with FIG. 4 and/or FIG. 6.

Each TPC command may apply to a respective uplink carrier provided by a higher layer parameter indicating a CC index in a CC set for Type A, such that a number of SRS TPC PDCCH configurations (e.g., "SRS-TPC-PDCCH-Config") configured by Type A inside an SRS carrier switching IE of the monitoring cell equals to a number of configured serving cells, and an i-th SRS TPC PDCCH configuration corresponds to an i-th configured serving cell, e.g., as described in connection with FIG. 4 and/or FIG. 6.

At 806, the base station receives the SRS on the one or more uplink carriers in response to the corresponding TPC command. The SRS may include aspects described in connection with the SRS 411 in FIG. 4. The reception of the SRS may be performed, e.g., by the SRS component 1144 of the apparatus 1102 in FIG. 11. The base station may perform measurements on the received SRS, e.g., in order to determine one or more parameters of an uplink channel. The base station may use the measurements for uplink scheduling, e.g., in selecting resources for communication with the UE.

Figure 9:
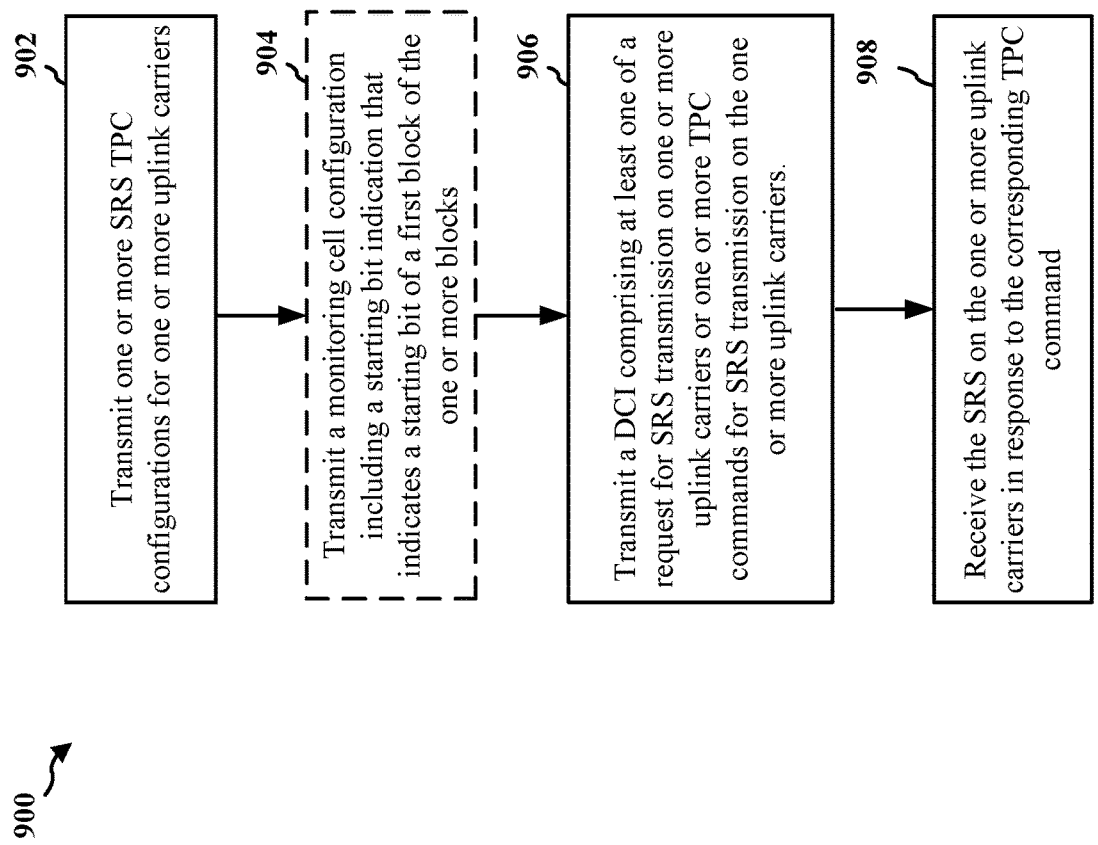
FIG. 9 is a flowchart of a method of wireless communication at a base station including SRS carrier switching in accordance with aspects of the present disclosure.

FIG. 9 is a flowchart 900 of a method of wireless communication. The method may be performed by a base station or a component of a base station (e.g., the base station 102, 180, 310, 402, 502; the apparatus 1102; a processing system, which may include the memory 376 and which may be the entire base station 310 or a component of the base station 310, such as the TX processor 316, the RX processor 370, and/or the controller/processor 375). Optional aspects are illustrated with a dashed line. The method may enable the base station to indicate a correspondence between an SRS request and/or TPC command received in DCI and a target carrier for Type B SRS carrier switching. For Type B SRS carrier switching, the DCI (e.g., which may be DCI format 2_3, may include a TPC command for a serving cell index and can also include an SRS request for SRS transmission on the serving cell.

At 902, the base station transmits to a UE one or more SRS TPC configurations for one or more uplink carriers. In some aspects, the base station may transmit a plurality of SRS TPC configurations for a plurality of uplink carriers. The configuration may be for Type B SRS carrier switching, e.g., as described in connection with FIG. 5. The configuration may correspond to the RRC configuration 503 in FIG. 5. The transmission of the SRS TPC configurations may be performed, e.g., by the SRS TPC configuration component 1140 of the apparatus 1102 in FIG. 11.

At 906, the base station transmits, on a monitoring cell, a DCI comprising at least one of a request for SRS transmission on one or more uplink carriers or one or more TPC commands for SRS transmission on the one or more uplink carriers, where a starting bit of each of the one or more TPC commands indicates a correspondence to a corresponding uplink carrier from the plurality of carriers. The transmission of the DCI may be performed, e.g., by the DCI component 1142 of the apparatus in FIG. 11. The DCI may include aspects described in connection with the DCI 505 in FIG. 5. The one or more TPC commands may be transmitted for Type B SRS carrier switching in control signaling comprising one or more blocks, each block comprising a TPC command for an uplink carrier. The base station may not configure two different uplink cells for the UE with different carrier switching types and having a same configured monitoring cell. The SRS TPC configuration for each of the one or more uplink carriers may include a starting bit indication that indicates a starting bit of a corresponding block within the one or more blocks, e.g., as described in connection with 507 in FIG. 5.

At 904, the base station may transmit a monitoring cell configuration including a starting bit indication that indicates a starting bit of a first block of the one or more blocks. The TPC commands may apply to the one or more uplink carriers based on a mapping between a consecutive order of the one or more blocks and an order of a subset of cells configured to receive SRS information from the monitoring cell, e.g., as described in connection with 509 in FIG. 5. The order of the subset of cells may be based on an increasing order of serving cell indexes for the subset of cells. The transmission may be performed, e.g., by the starting bit indication component 1146 of the apparatus 1102 in FIG. 11.

At 908, the base station receives the SRS on the one or more uplink carriers in response to the corresponding TPC command. The transmission of the SRS may include aspects described in connection with the SRS 511 in FIG. 5. The reception of the SRS may be performed, e.g., by the SRS component 1144 of the apparatus 1102 in FIG. 11. The base station may perform measurements on the received SRS, e.g., in order to determine one or more parameters of an uplink channel. The base station may use the measurements for uplink scheduling, e.g., in selecting resources for communication with the UE.

An apparatus may include additional components that perform each of the blocks of the algorithm in the flowcharts of FIG. 8, FIG. 9, and/or aspects performed by the base stations in FIGS. 4 and/or 5. As such, each block in the flowcharts of FIG. 8, FIG. 9, and/or aspects performed by the base stations in FIGS. 4 and/or 5, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
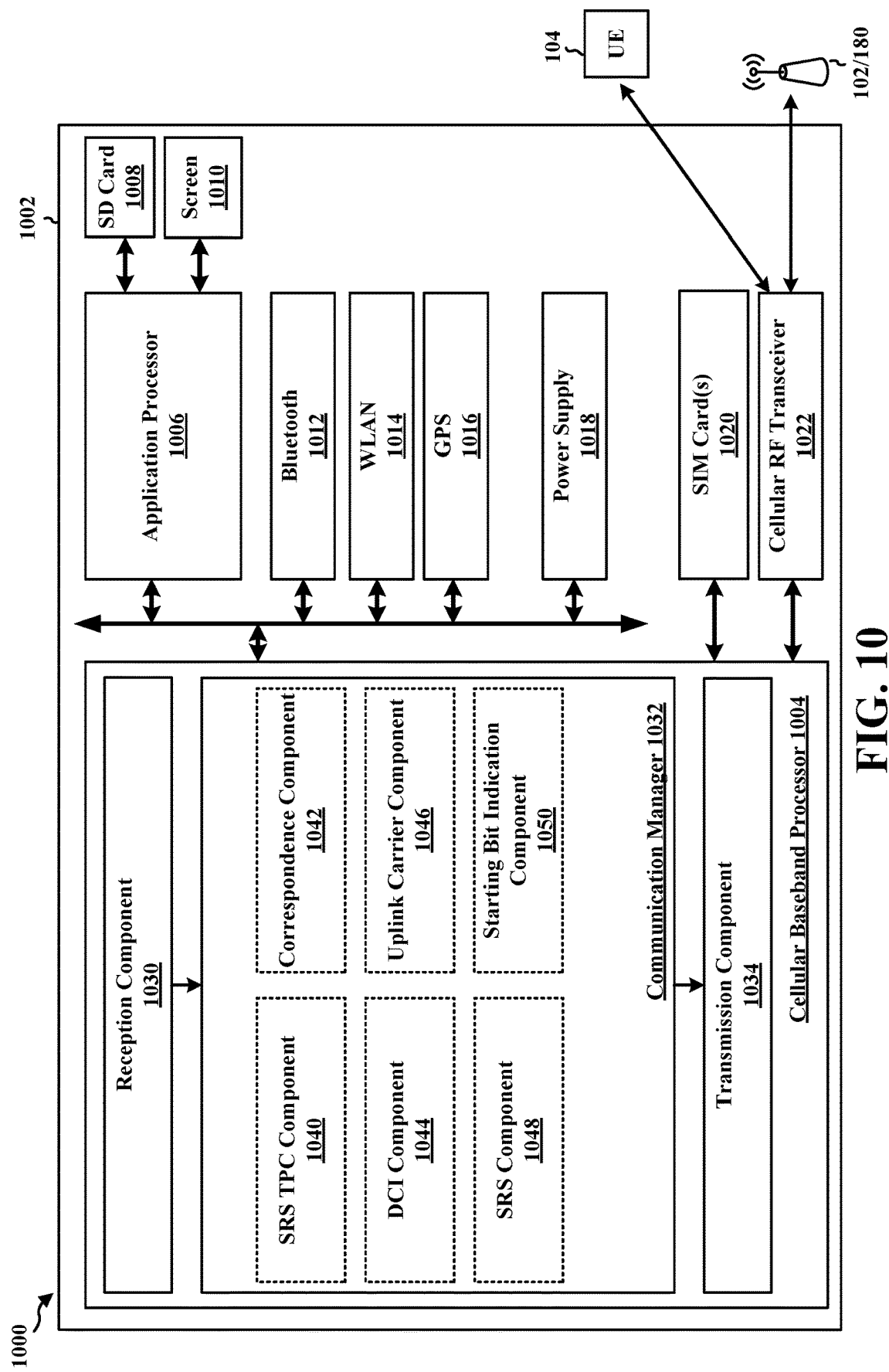
FIG. 10 is a diagram illustrating an example of a hardware implementation for an example apparatus configured to perform SRS carrier switching in accordance with aspects of the present disclosure.

FIG. 10 is a diagram 1000 illustrating an example of a hardware implementation for an apparatus 1002. The apparatus 1002 may be a UE or a component of a UE and includes a cellular baseband processor 1004 (also referred to as a modem) coupled to a cellular RF transceiver 1022. The apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described herein. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes an SRS TPC component 1040 configured to receive one or more SRS TPC configurations for one or more uplink carriers, e.g., as described in connection with 602 and/or 702 in FIG. 6 or 7. The communication manager 1032 may further include a correspondence component 1042 configured to determine the correspondence relation between each SRS TPC configuration and each uplink carrier, e.g., as described in connection with 604 in FIG. 6. The communication manager 1032 further includes a DCI component 1044 that is configured to receive a DCI comprising at least one of a request for SRS transmission on one or more uplink carriers or one or more TPC commands for the SRS transmission on the one or more uplink carriers, e.g., as described in connection with 606 and/or 706 in FIG. 6 or 7. The communication manager 1032 further includes an uplink carrier component 1046 that is configured to determine the one or more uplink carriers to which the at least one of the request for the SRS transmission or the one or more TPC commands corresponds, e.g., as described in connection with 608 and/or 708 in FIG. 6 or 7. In some aspects, the uplink carrier component 1046 may be configured to determine the one or more uplink carriers to which the at least one of the request for the SRS transmission or the one or more TPC commands corresponds at least based on the correspondence between the one or more SRS TPC configurations and the one or more uplink carriers, e.g., as described in connection with 608 in FIG. 6. In some aspects, the uplink carrier component 1046 may be configured to determine the one or more uplink carriers to which the at least one of the SRS request or the one or more TPC commands corresponds at least based on starting bit information, e.g., as described in connection with 708 in FIG. 7. The communication manager 1032 further includes an SRS component 1048 that is configured to transmit in response to receiving the DCI, an SRS on the one or more uplink carriers, e.g., as described in connection with 610 and/or 710 in FIG. 6 or 7. In some aspects, the SRS component 1048 may be configured to transmit the SRS on the one or more uplink carriers based on a correspondence between the plurality of SRS TPC configurations and the plurality of uplink carriers, e.g., as described in connection with 610 in FIG. 6 In some aspects, the SRS component 1048 may be configured to transmit the SRS on the one or more uplink carriers using a corresponding TPC command and starting bit information, e.g., as described in connection with 710. In some aspects, the communication manager 1032 may further include a starting bit indication component 1050 that is configured to receive a monitoring cell configuration including a starting bit indication that indicates a starting bit of a first block of the one or more blocks, wherein the one or more TPC commands are determined to apply to the one or more uplink carriers based on a mapping between a consecutive order of the one or more blocks and an order of a subset of cells configured to receive SRS information from the monitoring cell, e.g., as described in connection with 704 in FIG. 7. In some aspects, the reception component 1030 may be configured to receive the higher layer parameter indicating a CC index in the CC set for the type A SRS carrier switching, e.g., as described in connection with FIG. 6.

The apparatus may include additional components that perform each of the blocks of the algorithm in the flowcharts of FIGS. 6 and/or 7, or the aspects performed by the UEs in FIGS. 4 and/or 5. As such, each block in the flowcharts of FIGS. 6 and/or 7, or the aspects performed by the UEs in FIGS. 4 and/or 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In some aspects, the apparatus 1002, and in particular the cellular baseband processor 1004, may include means for receiving one or more SRS TPC configurations for a plurality of uplink carriers, wherein one or more SRS TPC configurations comprises a mapping from one uplink carrier to one or more CC sets; means for receiving a DCI comprising at least one of a request for SRS transmission on one or more uplink carriers or one or more TPC commands for the SRS transmission on the one or more uplink carriers; means for transmitting an SRS on the one or more uplink carriers based on a correspondence relation between the one or more SRS TPC configurations and the one or more uplink carriers. The apparatus 1002 may further include means for receiving the higher layer parameter indicating a CC index in the CC set for the type A SRS carrier switching. The apparatus may further include means for determining the correspondence between each SRS TPC configuration and each uplink carrier. The apparatus may further include determining a subset of carriers configured to receive a command for the SRS transmission or TPC command from the monitoring cell, and the correspondence relation between each SRS TPC configuration and each uplink carrier includes a relationship of an i-th SRS TPC configuration to an i-th uplink carrier of the subset of carriers when ranked in an increasing order of serving cell index. The apparatus may further include means for determining the one or more uplink carriers from the plurality of uplink carriers to which the at least one of the request for the SRS transmission or the one or more TPC commands corresponds at least based on the correspondence relation between the plurality of SRS TPC configurations and the plurality of uplink carriers. In some aspects, the apparatus 1002, and in particular the cellular baseband processor 1004 may include means for receiving one or more SRS TPC configurations for one or more uplink carriers; means for receiving, from a monitoring cell, a DCI comprising at least one of a request for SRS transmission on one or more uplink carriers or one or more TPC commands for the SRS transmission on the one or more uplink carriers; and means for transmitting the SRS on the one or more uplink carriers using a corresponding TPC command and starting bit information. In some aspects, the apparatus 1002 may further include means for determining the one or more uplink carriers to which the at least one of the SRS request or the one or more TPC commands corresponds at least based on the starting bit information. In some aspects, the apparatus 1002 may further include means for receiving a monitoring cell configuration including a starting bit indication that indicates a starting bit of a first block of the one or more blocks, where the one or more TPC commands are determined to apply to the one or more uplink carriers based on a mapping between a consecutive order of the one or more blocks and an order of a subset of cells configured to receive SRS information from the monitoring cell. The means may be one or more of the components of the apparatus 1002 configured to perform the functions recited by the means. As described herein, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
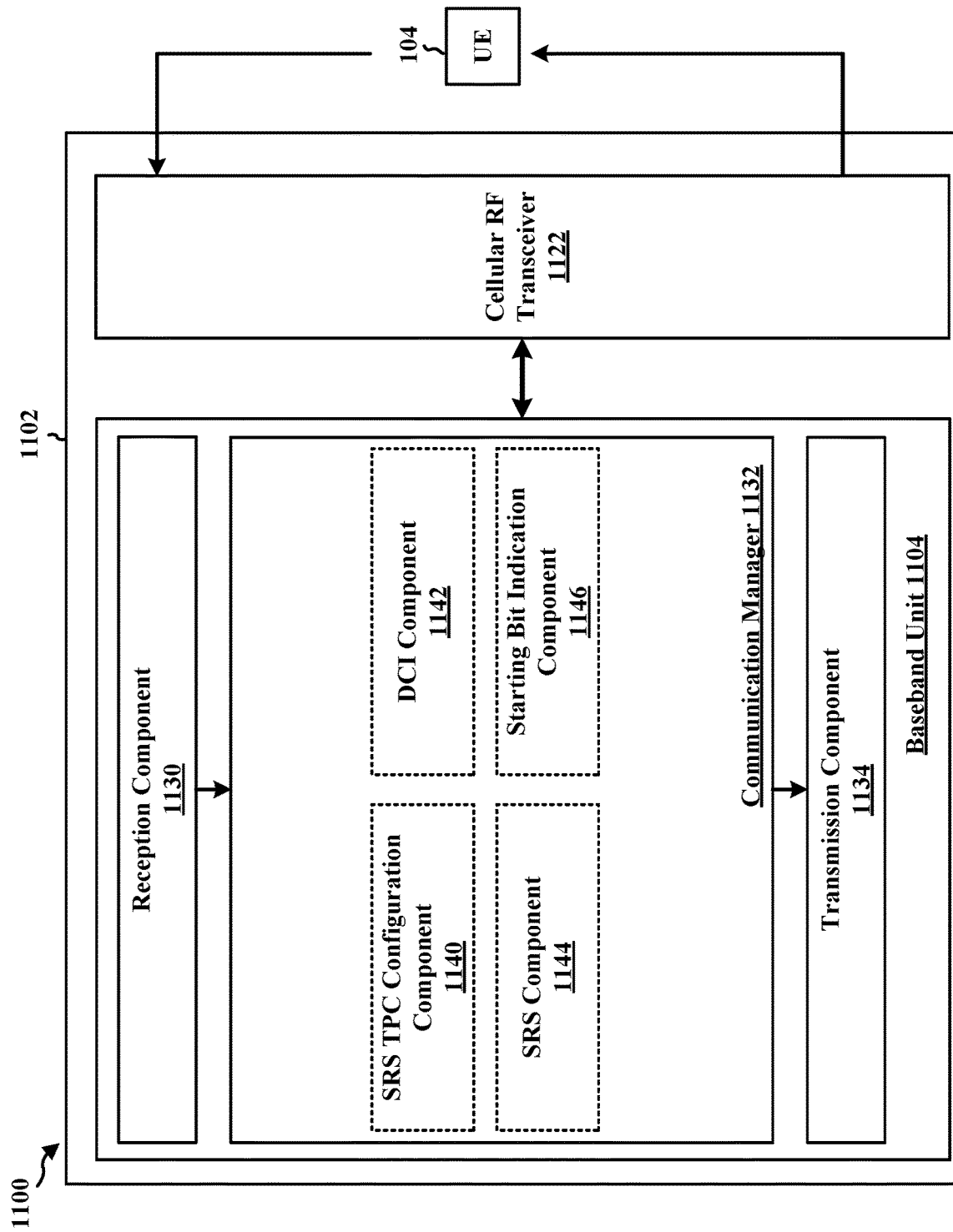
FIG. 11 is a diagram illustrating an example of a hardware implementation for an example apparatus with aspects to configure a UE to perform SRS carrier switching in accordance with aspects of the present disclosure.

FIG. 11 is a diagram 1100 illustrating an example of a hardware implementation for an apparatus 1102. The apparatus 1102 may be a base station and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described herein. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes an SRS TPC configuration component 1140 configured to transmit one or more TPC configurations for one or more uplink carriers, e.g., as described in connection with 802 and/or 902 in FIG. 8 or 9. In some aspects, each SRS TPC configuration may include a mapping from one uplink carrier to one or more CC sets, wherein a correspondence relation is provided between each SRS TPC configuration and each uplink carrier, e.g., as described in connection with 802. The communication manager 1132 further includes a DCI component 1142 configured to transmit a DCI comprising at least one of a request for SRS transmission on one or more uplink carriers or one or more TPC commands for SRS transmission on the one or more uplink carriers, e.g., as described in connection with 804 or 906 in FIG. 8 or 9. In some aspects, the DCI component 1142 may be configured to transmit the DCI to the UE comprising at least one of a request for SRS transmission on one or more uplink carriers or one or more TPC commands for SRS transmission on the one or more uplink carriers, wherein the at least one of the SRS request or the one or more TPC commands applies to an uplink carrier at least based on the correspondence between the one or more SRS TPC configurations and the one or more uplink carriers, e.g., as described in connection with 804 in FIG. 8. In some aspects, a starting bit of each of the one or more TPC commands may indicate a correspondence to a corresponding uplink carrier from the one or more uplink carriers, e.g., as described in connection with 806 in FIG. 8. The communication manager 1132 further includes an SRS component 1144 configured to receive the SRS on the one or more uplink carriers in response to the corresponding TPC command, e.g., as described in connection with 806 and/or 908 in FIGS. 8 and/or 9. In some aspects, the apparatus 1102 may further include a starting bit indication component 1146 configured to transmit a monitoring cell configuration including a starting bit indication that indicates a starting bit of a first block of the one or more blocks, wherein the one or more TPC commands apply to the one or more uplink carriers based on a mapping between a consecutive order of the one or more blocks and an order of a subset of cells configured to receive SRS information from the monitoring cell, e.g., as described in connection with 904 in FIG. 9.

The apparatus may include additional components that perform each of the blocks of the algorithm in the flowcharts of FIGS. 8 and/or 9, and the aspects performed by the base station in FIGS. 4 and/or 5. As such, each block in the flowcharts of FIGS. 8 and/or 9, and the aspects performed by the base station in FIGS. 4 and/or 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In some aspects, the apparatus 1102, and in particular the baseband unit 1104, may include means for transmitting, to a UE, one or more SRS TPC configurations for one or more uplink carriers, wherein each SRS TPC configuration comprises a mapping from one uplink carrier to one or more CC sets, wherein a correspondence relation is provided between each SRS TPC configuration and each uplink carrier; means for transmitting DCI to the UE comprising at least one of a request for SRS transmission on one or more uplink carriers or one or more TPC commands for SRS transmission on the one or more uplink carriers, wherein the at least one of the SRS request or the one or more TPC commands applies to an uplink carrier at least based on the correspondence relation between the one or more SRS TPC configurations and the one or more uplink carriers; and means for receiving the SRS on the one or more uplink carriers in response to the corresponding TPC command. In some aspects, the apparatus 1102, and in particular the baseband unit 1104, may include means for transmitting, to a UE, one or more SRS TPC configurations for one or more uplink carriers; means transmitting, on a monitoring cell, DCI the UE comprising at least one of a request for SRS transmission on one or more uplink carriers or one or more TPC commands for SRS transmission on the one or more uplink carriers, wherein a starting bit of each of the one or more TPC commands indicates a correspondence to a corresponding uplink carrier; and means for receiving the SRS on the one or more uplink carriers in response to the corresponding TPC command. The means may be one or more of the components of the apparatus 1102 configured to perform the functions recited by the means. As described herein, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

The following examples are illustrative only and aspects thereof may be combined with aspects of other examples, aspects, or teachings described herein, without limitation.

Aspect 1 is a method of wireless communication at a UE, comprising: receiving a plurality of SRS TPC configurations for a plurality of uplink carriers, wherein each SRS TPC configuration comprises a mapping from one uplink carrier to one or more CC sets; determining a correspondence relation between each SRS TPC configuration and each uplink carrier; receiving, from a monitoring cell, a DCI comprising at least one of a request for SRS transmission on one or more uplink carriers or one or more TPC commands for SRS transmission on the one or more uplink carriers; determining the one or more uplink carriers from the plurality of uplink carriers to which the at least one of the SRS request or the one or more TPC commands corresponds at least based on the correspondence relation between the plurality of SRS TPC configurations and the plurality of uplink carriers; and transmitting the SRS on the one or more uplink carriers using the corresponding TPC command.

In aspect 2, the method of aspect 1 further includes that the one or more TPC commands are received for Type A SRS carrier switching.

In aspect 3, the method of aspect 1 or aspect 2 further includes that determining the correspondence relation between each SRS TPC configuration and each uplink carrier comprises relating an i-th SRS TPC configuration to an i-th configured serving cell when ranked in an increasing order of serving cell index, wherein the UE applies a corresponding TPC command to an uplink carrier when transmitting the SRS.

In aspect 4, the method of any of aspects 1-3 further includes that the correspondence relation between each of the plurality of SRS TPC configurations and each of the plurality of uplink carriers comprises relating an i-th SRS TPC configuration to a serving cell with a serving cell index "i" and applying the one or more TPC commands to the one or more uplink carriers based on the serving cell index.

In aspect 5, the method of any of aspects 1-4 further includes that a subset of carriers configured to receive a command for the SRS transmission or TPC command from the monitoring cell is determined, and the correspondence relation between each SRS TPC configuration and each uplink carrier comprises relating an i-th SRS TPC configuration to an i-th uplink carrier of the subset of carriers when ranked in an increasing order of serving cell index.

In aspect 6, the method of any of aspects 1-5 further includes that each TPC command applies to a respective uplink carrier provided by a higher layer parameter indicating a CC index in a CC set for Type A, such that a number of SRS-TPC-PDCCH-Configuration configured by Type A inside an SRS carrier switching information element (IE) of the monitoring cell equals to a number of configured serving cells, and an i-th SRS-TPC-PDCCH-Configuration corresponds to an i-th configured serving cell.

Aspect 7 is a device including one or more processors and one or more memories in electronic communication with the one or more processors storing instructions executable by the one or more processors to cause the device to implement a method as in any of aspects 1-6.

Aspect 8 is a system or apparatus including means for implementing a method or realizing an apparatus as in any of aspects 1-6.

Aspect 9 is a non-transitory computer readable medium storing instructions executable by one or more processors to cause the one or more processors to implement a method as in any of aspects 1-6.

Aspect 10 includes a method of wireless communication at a user equipment (UE), comprising: receiving a plurality of SRS TPC configurations for a plurality of uplink carriers; receiving, from a monitoring cell, a DCI comprising at least one of a request for SRS transmission on one or more uplink carriers or one or more TPC commands for SRS transmission on the one or more uplink carriers; determining the one or more uplink carriers from the plurality of uplink carriers to which the at least one of the SRS request or the one or more TPC commands corresponds at least based on starting bit information; and transmitting the SRS on the one or more uplink carriers using the corresponding TPC command.

In aspect 11, the method of aspect 10 further includes that the one or more TPC commands are received for Type B SRS carrier switching in control signaling comprising one or more blocks, each block comprising a TPC command for an uplink carrier.

In aspect 12, the method of aspect 10 or aspect 11 further includes that the SRS TPC configuration for each of the plurality of uplink carriers includes a starting bit indication that indicates a starting bit of a corresponding block within the one or more blocks.

In aspect 13, the method of any of aspects 10-12 further include receiving a monitoring cell configuration including a starting bit indication that indicates a starting bit of a first block of the one or more blocks, wherein the one or more TPC commands are determined to apply to the one or more uplink carriers based on a mapping between a consecutive order of the one or more blocks and an order of a subset of cells configured to receive SRS information from the monitoring cell.

In aspect 14, the method of any of aspects 10-13 further include that the order of the subset of cells is based on an increasing order of serving cell indexes for the subset of cells.

In aspect 15, the method of any of aspects 10-14 further include that the UE does not expect to receive the configuration of two different uplink cells with different carrier switching types and having a same configured monitoring cell.

Aspect 16 is a device including one or more processors and one or more memories in electronic communication with the one or more processors storing instructions executable by the one or more processors to cause the device to implement a method as in any of aspects 10-15.

Aspect 17 is a system or apparatus including means for implementing a method or realizing an apparatus as in any of aspects 10-15.

Aspect 18 is a non-transitory computer readable medium storing instructions executable by one or more processors to cause the one or more processors to implement a method as in any of aspects 10-15.

Aspect 19 is a method of wireless communication at a base station, comprising: transmitting, to a UE a plurality of SRS TPC configurations for a plurality of uplink carriers, wherein each SRS TPC configuration comprises a mapping from one uplink carrier to one or more CC sets, wherein a correspondence relation is provided between each SRS TPC configuration and each uplink carrier; transmitting, on a monitoring cell, DCI to the UE comprising at least one of a request for SRS transmission on one or more uplink carriers or one or more TPC commands for SRS transmission on the one or more uplink carriers, wherein the at least one of the SRS request or the one or more TPC commands applies to an uplink carrier at least based on the correspondence relation between the plurality of SRS TPC configurations and the plurality of uplink carriers; and receiving the SRS on the one or more uplink carriers in response to the corresponding TPC command.

In aspect 20, the method of aspect 19 further includes that the one or more TPC commands are for Type A SRS carrier switching.

In aspect 21, the method of aspect 19 or aspect 20 further includes that the correspondence relation between each SRS TPC configuration and each uplink carrier comprises relating an i-th SRS TPC configuration to an i-th configured serving cell when ranked in an increasing order of serving cell index.

In aspect 22, the method of any of aspects 19-21 further includes that the correspondence relation between each of the plurality of SRS TPC configurations and each of the plurality of uplink carriers comprises relating an i-th SRS TPC configuration to a serving cell with a serving cell index "i" and applying the one or more TPC commands to the one or more uplink carriers based on the serving cell index.

In aspect 23, the method of any of aspects 19-22 further includes that a subset of carriers are configured to receive a command for the SRS transmission or the one or more TPC commands from the monitoring cell, and the correspondence relation between each SRS TPC configuration and each uplink carrier comprises relating an i-th SRS TPC configuration to an i-th uplink carrier of the subset of carriers when ranked in an increasing order of serving cell index.

In aspect 24, the method of any of aspects 19-23 further includes that each TPC command applies to a respective uplink carrier provided by a higher layer parameter indicating a CC index in a CC set for Type A, such that a number of SRS-TPC-PDCCH-Configuration configured by Type A inside an SRS carrier switching information element (IE) of the monitoring cell equals to a number of configured serving cells, and an i-th SRS-TPC-PDCCH-Configuration corresponds to an i-th configured serving cell.

Aspect 25 is a device, or apparatus, including one or more processors and one or more memories in electronic communication with the one or more processors storing instructions executable by the one or more processors to cause the device to implement a method as in any of aspects 19-24.

Aspect 26 is a system or apparatus including means for implementing a method or realizing an apparatus as in any of aspects 19-24.

Aspect 27 is a non-transitory computer readable storage medium storing instructions executable by one or more processors to cause the one or more processors to implement a method as in any of aspects 19-24.

Aspect 28 is a method of wireless communication at a base station, comprising: transmitting, to a UE, a plurality of SRS TPC configurations for a plurality of uplink carriers; transmitting, on a monitoring cell, DCI to the UE comprising at least one of a request for SRS transmission on one or more uplink carriers or one or more TPC commands for SRS transmission on the one or more uplink carriers, wherein a starting bit of each of the one or more TPC commands indicates a correspondence to a corresponding uplink carrier from the plurality of uplink carriers; and receiving the SRS on the one or more uplink carriers in response to the corresponding TPC command.

In aspect 29, the method of aspect 28 further includes that the one or more TPC commands are for Type B SRS carrier switching in control signaling comprising one or more blocks, each block comprising a TPC command for an uplink carrier.

In aspect 30, the method of aspect 28 or aspect 29 further includes that the SRS TPC configuration for each of the plurality of uplink carriers includes a starting bit indication that indicates a first block starting bit of a corresponding block within the one or more blocks.

In aspect 31, the method of any of aspects 28-30 further includes transmitting a monitoring cell configuration including a starting bit indication that indicates a starting bit of a first block of the one or more blocks, wherein the one or more TPC commands apply to the one or more uplink carriers based on a mapping between a consecutive order of the one or more blocks and an order of a subset of cells configured to receive SRS information from the monitoring cell.

In aspect 32, the method of any of aspects 28-31 further includes that the order of the subset of cells is based on an increasing order of serving cell indexes for the subset of cells.

In aspect 33, the method of any of aspects 28-32 further includes that the base station does not configure two different uplink cells for the UE with different carrier switching types and having a same configured monitoring cell.

aspect 34 is a device including one or more processors and one or more memories in electronic communication with the one or more processors storing instructions executable by the one or more processors to cause the device to implement a method as in any of aspects 28-33.

Aspect 35 is a system or apparatus including means for implementing a method or realizing an apparatus as in any of aspects 28-33.

Aspect 36 is a non-transitory computer readable medium storing instructions executable by one or more processors to cause the one or more processors to implement a method as in any of aspects 28-33.

Aspect 37 is a method of wireless communication at a UE, comprising: receiving a one or more SRS TPC configurations for a plurality of uplink carriers, wherein the one or more SRS TPC configurations comprise a mapping from one uplink carrier to one or more CC sets; receiving a DCI comprising at least one of a request for SRS transmission on one or more uplink carriers or one or more TPC commands for the SRS transmission on the one or more uplink carriers; and transmitting an SRS on the one or more uplink carriers based on a correspondence between the one or more SRS TPC configurations and the one or more uplink carriers.

In aspect 38, the method of aspect 37 further includes that the one or more TPC commands are received for Type A SRS carrier switching.

In aspect 39, the method of aspect 38 further includes that a number of the one or more SRS TPC configurations configured for the Type A SRS carrier switching inside at least one SRS carrier switching IE equals a number of configured serving cells, and wherein transmitting the SRS on the one or more uplink carriers includes: applying each TPC command received in the DCI to a respective uplink carrier provided by a higher layer parameter such that an i-th SRS TPC configuration corresponds to an i-th configured serving cell for the UE.

In aspect 40, the method of any of aspects 37-39 further includes receiving the higher layer parameter indicating a CC index in the CC set for the type A SRS carrier switching.

In aspect 41, the method of any of aspects 37-40 further includes that each TPC command applies to a respective uplink carrier provided by a higher layer parameter indicating a component carrier (CC) index in a CC set for Type A, such that a number of SRS TPC physical downlink control channel (PDCCH) configurations configured for Type A inside an SRS carrier switching information element (IE) equals a number of configured serving cells, and an i-th SRS-TPC-PDCCH-Configuration corresponds to an i-th configured serving cell.

In aspect 42, the method of any of aspects 37-41 further includes determining the correspondence between each SRS TPC configuration and each uplink carrier.

In aspect 43, the method of aspect 42 further includes that transmitting the SRS includes applying a corresponding TPC command to an uplink carrier based on the correspondence between each SRS TPC configuration and each uplink carrier comprises relating an i-th SRS TPC configuration to an i-th configured serving cell when ranked in an increasing order of serving cell index.

In aspect 44, the method of aspect 42 further includes that the correspondence between each of the one or more SRS TPC configurations and each of the one or more uplink carriers comprises relating an i-th SRS TPC configuration to a serving cell with a serving cell index "i", and wherein transmitting the SRS includes applying the one or more TPC commands to the one or more uplink carriers based on the serving cell index.

In aspect 45, the method of aspect 42 further includes that a subset of carriers are configured to receive a command for the SRS transmission or TPC command from the monitoring cell, and the correspondence between each SRS TPC configuration and each uplink carrier includes a relationship of an i-th SRS TPC configuration to an i-th uplink carrier of the subset of carriers when ranked in an increasing order of serving cell index.

In aspect 46, the method of any of aspects 37-46 further includes that the one or more uplink carriers to which the at least one of the request for the SRS transmission or the one or more TPC commands corresponds at least based on the correspondence between the one or more SRS TPC configurations and the one or more uplink carriers.

Aspect 47 is an apparatus for wireless communication at a UE, comprising: a memory; and at least one processor coupled to the memory, wherein the memory and the at least one processor are configured to perform the method of any of aspects 37-46.

Aspect 48 is an apparatus for wireless communication at a UE, comprising means to perform the method of any of aspects 37-46.

Aspect 49 is a non-transitory computer-readable storage medium storing computer executable code for wireless communication at a UE, the code when executed by a processor cause the processor to perform the method of any of aspects 37-46.

Aspect 50 is a method of wireless communication at a UE, comprising: receiving one or more SRS TPC configurations for one or more uplink carriers; receiving a DCI comprising at least one of a request for SRS transmission on one or more uplink carriers or one or more TPC commands for the SRS transmission on the one or more uplink carriers; and transmitting the SRS on the one or more uplink carriers using a corresponding TPC command and starting bit information.

In aspect 51, the method of aspect 50 further includes that the UE receives the one or more TPC commands for Type B SRS carrier switching in control signaling comprising one or more blocks, each block comprising a TPC command for an uplink carrier.

In aspect 52, the method of aspect 50 or aspect 51 further includes that the SRS TPC configuration for each of the one or more uplink carriers includes the starting bit information that indicates a starting bit of a corresponding block for a corresponding uplink carrier within the one or more blocks.

In aspect 53, the method of any of aspects 50-52 further includes determining the one or more uplink carriers from the one or more uplink carriers to which the at least one of the SRS request or the one or more TPC commands corresponds at least based on the starting bit information.

In aspect 54, the method of any of aspects 50-53 further includes receiving a monitoring cell configuration including a starting bit indication that indicates a starting bit of a first block of the one or more blocks, wherein the one or more TPC commands are determined to apply to the one or more uplink carriers based on a mapping between a consecutive order of the one or more blocks and an order of a subset of cells configured to receive SRS information from the monitoring cell.

In aspect 55, the method of aspect 54 further includes that the order of the subset of cells is based on an increasing order of serving cell indexes for the subset of cells.

In aspect 56, the method of any of aspects 50-55 further includes that the UE does not expect to receive the configuration of two different uplink cells with different carrier switching types and having a same configured monitoring cell.

Aspect 57 in an apparatus for wireless communication at a UE, comprising: a memory; and at least one processor coupled to the memory, wherein the memory and the at least one processor are configured to perform the method of any of aspects 50-56.

Aspect 58 is an apparatus for wireless communication at a UE, comprising means to perform the method of any of aspects 50-56.

Aspect 59 is a non-transitory computer-readable storage medium storing computer executable code for wireless communication at a UE, the code when executed by a processor cause the processor to perform the method of any of aspects 50-56.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving one or more sounding reference signal (SRS) transmission power control (TPC) configurations for Type A SRS carrier switching on one or more uplink carriers, wherein the one or more SRS TPC configurations comprises a mapping from one uplink carrier to one or more component carrier (CC) sets;
   receiving a downlink control information (DCI) comprising at least one of: a request for SRS transmission on the one or more uplink carriers; or one or more TPC commands for the SRS transmission on the one or more uplink carriers; and
   transmitting an SRS on the one or more uplink carriers based on a correspondence between the one or more SRS TPC configurations and the one or more uplink carriers, wherein one of:
      a first number of the one or more SRS TPC configurations configured for the Type A SRS carrier switching inside at least one SRS carrier switching information element (IE) equals a second number of configured serving cells and transmitting the SRS on the one or more uplink carriers includes applying each TPC command received in the DCI to a respective uplink carrier provided by a higher layer parameter such that an i-th SRS TPC configuration corresponds to an i-th configured serving cell for the UE,
      each TPC command applies to the respective uplink carrier provided by the higher layer parameter indicating a component carrier (CC) index in a CC set for the Type A SRS carrier switching, such that a third number of SRS TPC physical downlink control channel (PDCCH) configurations configured for the Type A SRS carrier switching inside an SRS carrier switching information element (IE) equals the second number of configured serving cells, and an i-th SRS-TPC-PDCCH-Configuration corresponds to the i-th configured serving cell,
      transmitting the SRS includes applying a corresponding TPC command to an uplink carrier based on the correspondence between each SRS TPC configuration and each uplink carrier comprises relating the i-th SRS TPC configuration to the i-th configured serving cell when ranked in an increasing order of serving cell indexes, transmitting the SRS includes applying the one or more TPC commands to the one or more uplink carriers based on a serving cell index and based on the correspondence between each of the one or more SRS TPC configurations and each of the one or more uplink carriers comprises relating the i-th SRS TPC configuration to a serving cell with the serving cell index "i", or a subset of carriers are configured to receive a command for the SRS transmission or TPC command from a monitoring cell, and the correspondence between each SRS TPC configuration and each uplink carrier includes a relationship of the i-th SRS TPC configuration to an i-th uplink carrier of the subset of carriers when ranked in the increasing order of serving cell indexes.

2. The method of claim 1, wherein the first number of the one or more SRS TPC configurations configured for the Type A SRS carrier switching inside the at least one SRS carrier switching IE equals the second number of configured serving cells, and wherein transmitting the SRS on the one or more uplink carriers includes:

applying each TPC command received in the DCI to the respective uplink carrier provided by the higher layer parameter such that the i-th SRS TPC configuration corresponds to the i-th configured serving cell for the UE.

3. The method of claim 1, further comprising:
receiving the higher layer parameter indicating the CC index in the CC set for the type A SRS carrier switching.

4. The method of claim 1, wherein each TPC command applies to the respective uplink carrier provided by the higher layer parameter indicating the CC index in the CC set for the Type A SRS carrier switching, such that the third number of SRS TPC PDCCH configurations configured for the Type A SRS carrier switching inside the SRS carrier switching IE equals the second number of configured serving cells, and the i-th SRS-TPC-PDCCH-Configuration corresponds to the i-th configured serving cell.

5. The method of claim 1, further comprising:
determining the correspondence between each SRS TPC configuration and each uplink carrier.

6. The method of claim 1, wherein transmitting the SRS includes applying the corresponding TPC command to the uplink carrier based on the correspondence between each SRS TPC configuration and each uplink carrier comprises relating the i-th SRS TPC configuration to the i-th configured serving cell when ranked in the increasing order of serving cell indexes.

7. The method of claim 1, wherein transmitting the SRS includes applying the one or more TPC commands to the one or more uplink carriers based on the serving cell index and based on the correspondence between each of the one or more SRS TPC configurations and each of the one or more uplink carriers comprises relating the i-th SRS TPC configuration to the serving cell with the serving cell index "i".

8. The method of claim 1, wherein the subset of carriers are configured to receive the command for the SRS transmission or the TPC command from the monitoring cell, and the correspondence between each SRS TPC configuration and each uplink carrier includes the relationship of the i-th SRS TPC configuration to the i-th uplink carrier of the subset of carriers when ranked in the increasing order of serving cell indexes.

9. The method of claim 1, wherein the one or more uplink carriers which the at least one of the request for the SRS transmission or the one or more TPC commands corresponds is based on the correspondence between the one or more SRS TPC configurations and the one or more uplink carriers.

10. An apparatus for wireless communication at a user equipment (UE), comprising:
a memory; and
at least one processor coupled to the memory and configured to:
receive one or more sounding reference signal (SRS) transmission power control (TPC) configurations for Type A SRS carrier switching on one or more uplink carriers, wherein the one or more SRS TPC configurations comprise a mapping from one uplink carrier to one or more component carrier (CC) sets;
receive, a downlink control information (DCI) comprising at least one of a request for SRS transmission on the one or more uplink carriers or one or more TPC commands for the SRS transmission on the one or more uplink carriers; and
transmit, in response to the DCI, an SRS on the one or more uplink carriers based on a correspondence between the one or more TPC configurations and the one or more uplink carriers, wherein one of:
a first number of the one or more SRS TPC configurations configured for the Type A SRS carrier switching inside at least one SRS carrier switching information element (IE) equals a second number of configured serving cells, and to transmit the SRS on the one or more uplink carriers, the at least one processor is further configured to apply each TPC command received in the DCI to a respective uplink carrier provided by a higher layer parameter such that an i-th SRS TPC configuration corresponds to an i-th configured serving cell for the UE,
each TPC command applies to the respective uplink carrier provided by the higher layer parameter indicating a component carrier (CC) index in a CC set for the Type A SRS carrier switching, such that a third number of SRS TPC physical downlink control channel (PDCCH) configurations configured for the Type A SRS carrier switching inside an SRS carrier switching IE equals the second number of configured serving cells, and an i-th SRS-TPC-PDCCH-Configuration corresponds to the i-th configured serving cell,
to transmit the SRS on the one or more uplink carriers, the at least one processor is further configured to apply a corresponding TPC command to an uplink carrier based on the correspondence between each SRS TPC configuration and each uplink carrier comprises relating the i-th SRS TPC configuration to the i-th configured serving cell when ranked in an increasing order of serving cell indexes,
to transmit the SRS on the one or more uplink carriers, the at least one processor is further configured to apply the one or more TPC commands to the one or more uplink carriers based on a serving cell index and based on the correspondence between each of the one or more SRS TPC configurations and each of the one or more uplink carriers comprises relating the i-th SRS TPC configuration to a serving cell with the serving cell index "i", or a subset of carriers are configured to receive a command for the SRS transmission or TPC command from a monitoring cell, and the correspondence between each SRS TPC configuration and each uplink carrier includes a relationship of the i-th SRS TPC configuration to an i-th uplink carrier of the subset of carriers when ranked in the increasing order of serving cell indexes.

11. The apparatus of claim 10, wherein the first number of the one or more SRS TPC configurations configured for the Type A SRS carrier switching inside the at least one SRS carrier switching IE equals the second number of configured serving cells, and wherein to transmit the SRS on the one or more uplink carriers, the memory and the at least one processor are further configured to:

apply each TPC command received in the DCI to the respective uplink carrier provided by the higher layer parameter such that the i-th SRS TPC configuration corresponds to the i-th configured serving cell for the UE.

12. The apparatus of claim 10, wherein the memory and the at least one processor are further configured to:

receive the higher layer parameter indicating the CC index in the CC set for the type A SRS carrier switching.

13. The apparatus of claim 10, wherein each TPC command applies to the respective uplink carrier provided by the higher layer parameter indicating the CC index in the CC set for the Type A SRS carrier switching, such that the third number of SRS TPC PDCCH configurations configured for the Type A SRS carrier switching inside the SRS carrier switching IE equals the second number of configured serving cells, and the i-th SRS-TPC-PDCCH-Configuration corresponds to the i-th configured serving cell.

14. The apparatus of claim 10, wherein the at least one processor is further configured to:

determine the correspondence between each SRS TPC configuration and each uplink carrier.

15. The apparatus of claim 10, wherein the subset of carriers are configured to receive the command for the SRS transmission or the TPC command from the monitoring cell, and the correspondence between each SRS TPC configuration and each uplink carrier includes the relationship of the i-th SRS TPC configuration to the i-th uplink carrier of the subset of carriers when ranked in the increasing order of serving cell indexes.

16. The apparatus of claim 10, wherein the one or more uplink carriers to which the at least one of the request for the SRS transmission or the one or more TPC commands corresponds at least based on the correspondence between the one or more SRS TPC configurations and the one or more uplink carriers.

17. The apparatus of claim 10, wherein to transmit the SRS, the at least one processor is further configured to apply the corresponding TPC command to the uplink carrier based on the correspondence between each SRS TPC configuration and each uplink carrier comprises relating the i-th SRS TPC configuration to the i-th configured serving cell when ranked in the increasing order of serving cell indexes.

18. The apparatus of claim 10, wherein to transmit the SRS, the at least one processor is further configured to apply the one or more TPC commands to the one or more uplink carriers based on the serving cell index and based on the correspondence between each of the one or more SRS TPC configurations and each of the one or more uplink carriers comprises relating the i-th SRS TPC configuration to the serving cell with the serving cell index "i".

19. A method of wireless communication at a user equipment (UE), comprising:

receiving one or more sounding reference signal (SRS) transmission power control (TPC) configurations for one or more uplink carriers;

receiving a monitoring cell configuration including a starting bit indication that indicates a starting bit of a first block of one or more blocks, receiving, from a monitoring cell, a downlink control information (DCI) comprising at least one of a request for SRS transmission on the one or more uplink carriers or one or more TPC commands for the SRS transmission on the one or more uplink carriers, wherein the one or more TPC commands are determined to apply to the one or more uplink carriers based on a mapping between a consecutive order of the one or more blocks and an order of a subset of cells configured to receive SRS information from the monitoring cell; and transmitting SRS on the one or more uplink carriers from the one or more uplink carriers based on a corresponding TPC command and corresponding starting bit information.

20. The method of claim 19, wherein the UE receives the one or more TPC commands for Type B SRS carrier switching in control signaling comprising one or more blocks, each block comprising a TPC command for an uplink carrier.

21. The method of claim 20, wherein the SRS TPC configurations for each of the one or more uplink carriers includes the corresponding starting bit information that indicates the starting bit of a corresponding block for a corresponding uplink carrier within the one or more blocks.

22. The method of claim 21, wherein the order of the subset of cells is based on an increasing order of serving cell indexes for the subset of cells.

23. The method of claim 20, further comprising:

determining the one or more uplink carriers from the one or more uplink carriers to which the at least one of the request for the SRS transmission or the one or more TPC commands corresponds at least based on the corresponding starting bit information.

24. The method of claim 19, wherein the UE does not expect to receive a configuration of two different uplink cells with different carrier switching types and having a same configured monitoring cell.

25. An apparatus for wireless communication at a user equipment (UE), comprising:

a memory; and at least one processor coupled to the memory, wherein the memory and the at least one processor are configured to:

receive one or more sounding reference signal (SRS) transmission power control (TPC) configurations for one or more uplink carriers;

receive a monitoring cell configuration including a starting bit indication that indicates a starting bit of a first block of one or more blocks, receive, from a monitoring cell, a downlink control information (DCI) comprising at least one of a request for SRS transmission on the one or more uplink carriers or one or more TPC commands for the SRS transmission on the one or more uplink carriers, wherein the one or more TPC commands are determined to apply to the one or more uplink carriers based on a mapping between a consecutive order of the one or more blocks and an order of a subset of cells configured to receive SRS information from the monitoring cell; and transmit SRS on the one or more uplink carriers from the one or more uplink carriers based on a corresponding TPC command and corresponding starting bit information.

26. The apparatus of claim 25, wherein the memory and the at least one processor are configured to receive the one or more TPC commands for Type B SRS carrier switching in control signaling comprising one or more blocks, each block comprising a TPC command for an uplink carrier.

27. The apparatus of claim 26, wherein the one or more SRS TPC configurations for each of the one or more uplink carriers includes the corresponding starting bit information that indicates the starting bit of a corresponding block for a corresponding uplink carrier within the one or more blocks.

28. The apparatus of claim 25, wherein the apparatus is configured to not receive a configuration of two different uplink cells with different carrier switching types and having a same configured monitoring cell.

\* \* \* \* \*